US010465412B1

(12) United States Patent
Currid

(10) Patent No.: US 10,465,412 B1
(45) Date of Patent: Nov. 5, 2019

(54) HARD SHELL ROOFTOP TENT WITH UTILITY RAILS

(71) Applicant: Thule, Inc., Seymour, CT (US)

(72) Inventor: Evan Michael Currid, Santa Cruz, CA (US)

(73) Assignee: Thule, Inc., Seymour, CT (US)

( * ) Notice: Subject to any disclaimer, the term of this patent is extended or adjusted under 35 U.S.C. 154(b) by 0 days.

(21) Appl. No.: 16/107,225

(22) Filed: Aug. 21, 2018

Related U.S. Application Data

(63) Continuation of application No. 15/625,659, filed on Jun. 16, 2017, now Pat. No. 10,077,574, which is a continuation-in-part of application No. 15/254,961, filed on Sep. 1, 2016, now Pat. No. 9,995,055.

(60) Provisional application No. 62/351,175, filed on Jun. 16, 2016, provisional application No. 62/213,600, filed on Sep. 2, 2015.

(51) Int. Cl.
| | |
|---|---|
| *E04H 15/06* | (2006.01) |
| *B60P 3/38* | (2006.01) |
| *E04H 15/48* | (2006.01) |
| *E04H 15/00* | (2006.01) |
| *B60R 9/10* | (2006.01) |
| *B60R 9/058* | (2006.01) |

(52) U.S. Cl.
CPC ............ *E04H 15/06* (2013.01); *B60P 3/38* (2013.01); *E04H 15/008* (2013.01); *E04H 15/48* (2013.01); *B60R 9/058* (2013.01); *B60R 9/10* (2013.01)

(58) Field of Classification Search
CPC ............ E04H 15/06; B60P 3/38; B60P 3/39

USPC .......................................... 135/88.16
See application file for complete search history.

(56) References Cited

U.S. PATENT DOCUMENTS 2,530,450 A * 11/1950 Cast ........................ B60P 3/38
  135/116
2,811,725 A    11/1957 Cence
(Continued)

FOREIGN PATENT DOCUMENTS

| DE | 1780662 A1 | 10/1973 |
| FR | 2158927 A7 | 6/1973 |
| WO | 2005005754 A1 | 1/2005 |

OTHER PUBLICATIONS

AutoHome Columbus—the roof top car tent for any vehicle, download from http://www.autohomeus.com/roof-top-tents/columbus-tent/ on Apr. 11, 2016 (2 pages).
(Continued)

*Primary Examiner* — Noah Chandler Hawk
(74) *Attorney, Agent, or Firm* — Sterne, Kessler, Goldstein & Fox P.L.L.C.

(57) ABSTRACT

A tent system with utility rails is described. The hard shell tent system may include a first shell member, second shell member, utility rails, and an articulating mechanism. The first shell member may be adapted to mount to a roof of a vehicle. The second shell member may be adapted to mate with the first shell member and define an interior cavity when the tent system is in a closed position. The utility rails may be coupled to the second shell member and adapted to support items on top of the second shell member. The articulating mechanism may couple the first shell member to the second shell member and may transfer a weight of the second shell member and the utility rails to a roof of the vehicle when the tent system is in the open position.

22 Claims, 14 Drawing Sheets

(56) References Cited

U.S. PATENT DOCUMENTS

| | | | |
|---|---|---|---|
| 2,937,651 A | | 5/1960 | Van Tassel |
| 3,375,836 A | * | 4/1968 | Domeneghetti ........ E04H 15/06 |
| | | | 135/116 |
| 3,499,175 A | * | 3/1970 | Orberg ................... A47C 17/64 |
| | | | 135/88.16 |
| 3,924,365 A | | 12/1975 | Orberg |
| 3,957,068 A | | 5/1976 | Cox |
| 3,968,809 A | | 7/1976 | Beavers |
| D244,182 S | | 5/1977 | Skidmore et al. |
| D246,365 S | | 11/1977 | Floyd |
| 4,058,133 A | | 11/1977 | Barr et al. |
| D250,013 S | | 10/1978 | Siciliano |
| D255,027 S | | 5/1980 | Hemminger |
| 4,271,856 A | | 6/1981 | Ferguson |
| 4,366,979 A | | 1/1983 | Pillot |
| D273,001 S | | 3/1984 | Fink |
| 4,522,441 A | | 6/1985 | Allison |
| 4,548,438 A | | 10/1985 | Myers |
| D299,223 S | | 1/1989 | Galvin |
| D310,806 S | | 9/1990 | Hertzberg et al. |
| D318,446 S | | 7/1991 | Magyar et al. |
| D318,971 S | | 8/1991 | Mitchell |
| D327,463 S | | 6/1992 | Williams |
| D330,182 S | | 10/1992 | Jones |
| D332,934 S | | 2/1993 | Brown et al. |
| D333,646 S | | 3/1993 | Levy |
| 5,190,066 A | | 3/1993 | Joergensen |
| 5,203,603 A | | 4/1993 | Hertzberg |
| 5,226,261 A | | 7/1993 | Wilbourn et al. |
| D340,689 S | | 10/1993 | Wolcott et al. |
| D342,707 S | | 12/1993 | Fields |
| D352,328 S | | 11/1994 | Boyd |
| D352,690 S | | 11/1994 | Schorr |
| 5,544,671 A | | 8/1996 | Philips |
| D382,248 S | | 8/1997 | Long |
| 5,806,906 A | | 9/1998 | Hammond |
| D413,096 S | | 8/1999 | Russke et al. |
| D421,956 S | | 3/2000 | Aubut |
| 6,035,875 A | | 3/2000 | Chen |
| D428,382 S | | 7/2000 | Hall |
| D428,595 S | | 7/2000 | Salinas |
| D431,225 S | | 9/2000 | Perlman et al. |
| 6,145,525 A | | 11/2000 | Mooney |
| D444,445 S | | 7/2001 | Schroeder |
| D445,397 S | | 7/2001 | Gaytan |
| 6,260,306 B1 | | 7/2001 | Swetish et al. |
| 6,263,617 B1 | | 7/2001 | Turcot et al. |
| D454,328 S | | 3/2002 | Cornelius |
| D461,759 S | | 8/2002 | Napieraj |
| 6,722,084 B2 | | 4/2004 | Berman |
| D503,143 S | | 3/2005 | Napieraj |
| D516,497 S | | 3/2006 | Napieraj et al. |
| D521,414 S | | 5/2006 | Waters |
| 7,100,625 B2 | | 9/2006 | Valles |
| D544,402 S | | 6/2007 | Westman et al. |
| D574,315 S | | 8/2008 | Swails et al. |
| D610,067 S | | 2/2010 | Frankham |
| D619,077 S | | 7/2010 | Frankham |
| D619,078 S | | 7/2010 | Frankham |
| D620,995 S | | 8/2010 | Hamad |
| D628,126 S | | 11/2010 | Tai |
| D662,444 S | | 6/2012 | Smoak et al. |
| 8,245,464 B2 | | 8/2012 | Saiz et al. |
| 9,222,278 B2 | | 12/2015 | Park |
| D765,013 S | | 8/2016 | Hindelang et al. |
| 2003/0213512 A1 | | 11/2003 | Lee |
| 2008/0190472 A1 | | 8/2008 | Turcot |
| 2008/0313970 A1 | | 12/2008 | Turcot |
| 2016/0138293 A1 | | 5/2016 | Zhou |

OTHER PUBLICATIONS

Ebay Indigo Campers Roof Top Tent Review, download from https://outbackjoe.com/macho-divertissement/macho-articles/ebay-roof-top-tent-review/ on Apr. 11, 2016 (24 pages).

Product Spotlight: The new ARB Simpson III Roof Top Tent, download from http://forum.ih8mud.com/threads/product-spotlight-the-new-arb-simpson-iii-roof-top-tent.306676/ on Apr. 11, 2016 (12 pages).

* cited by examiner

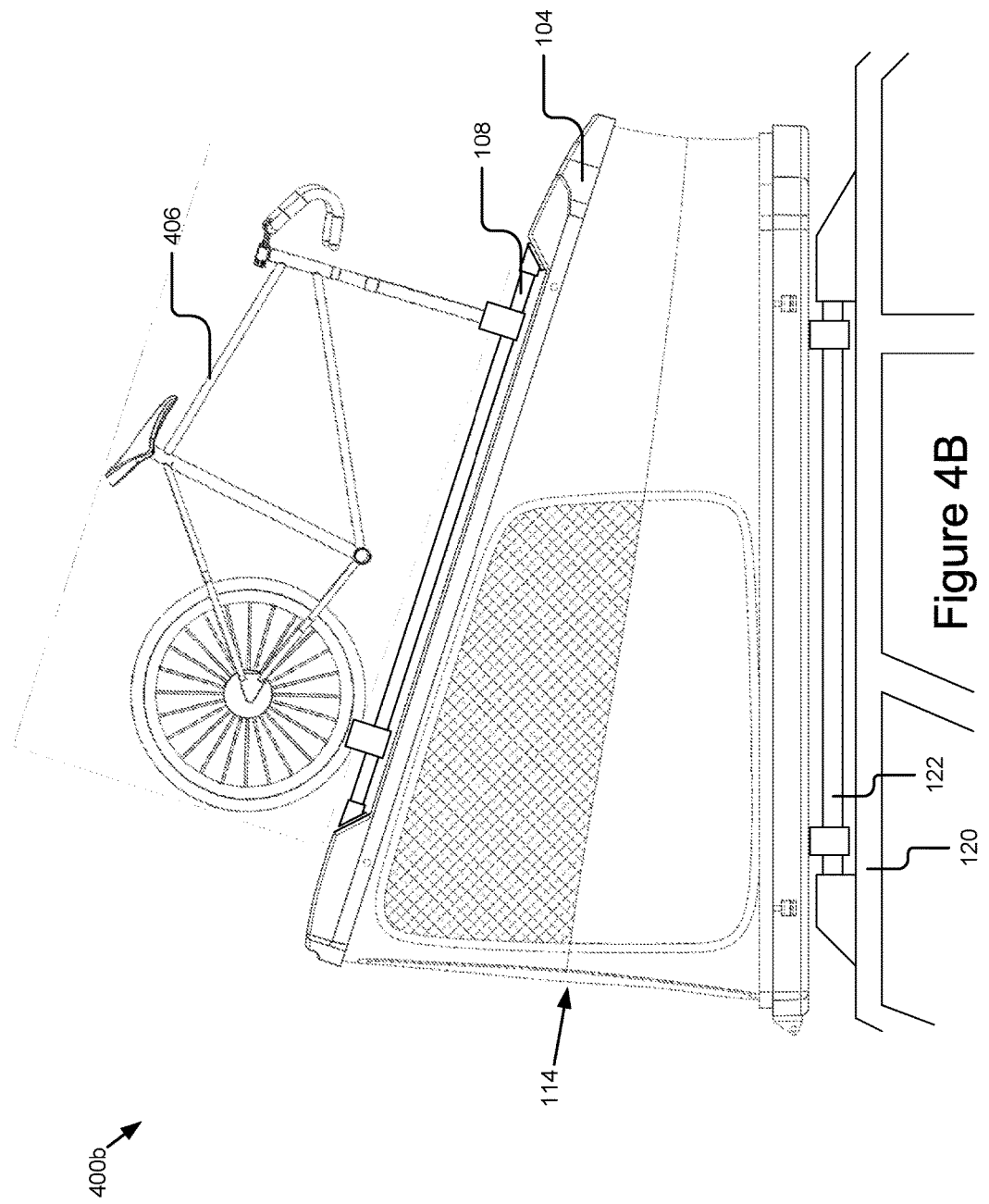

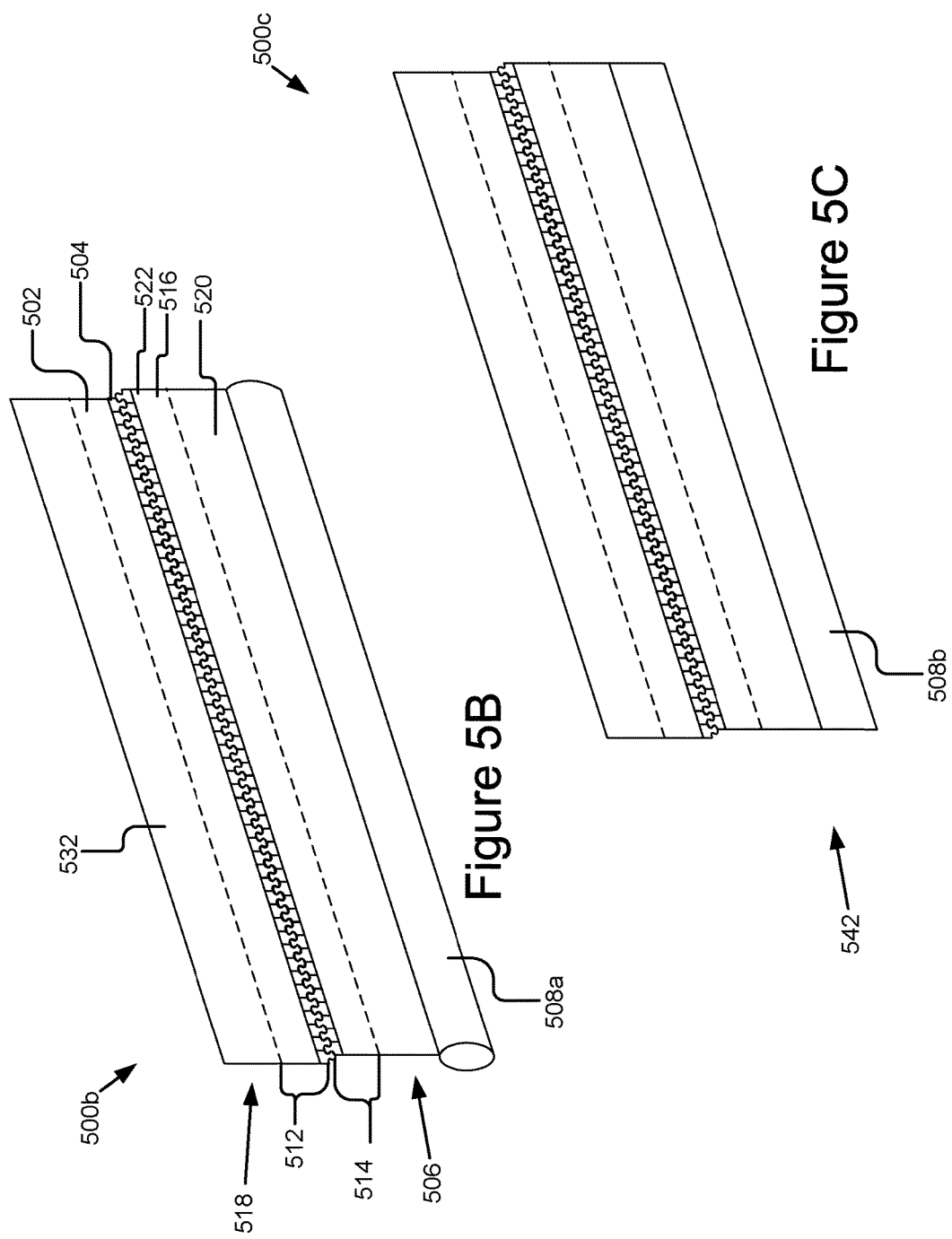

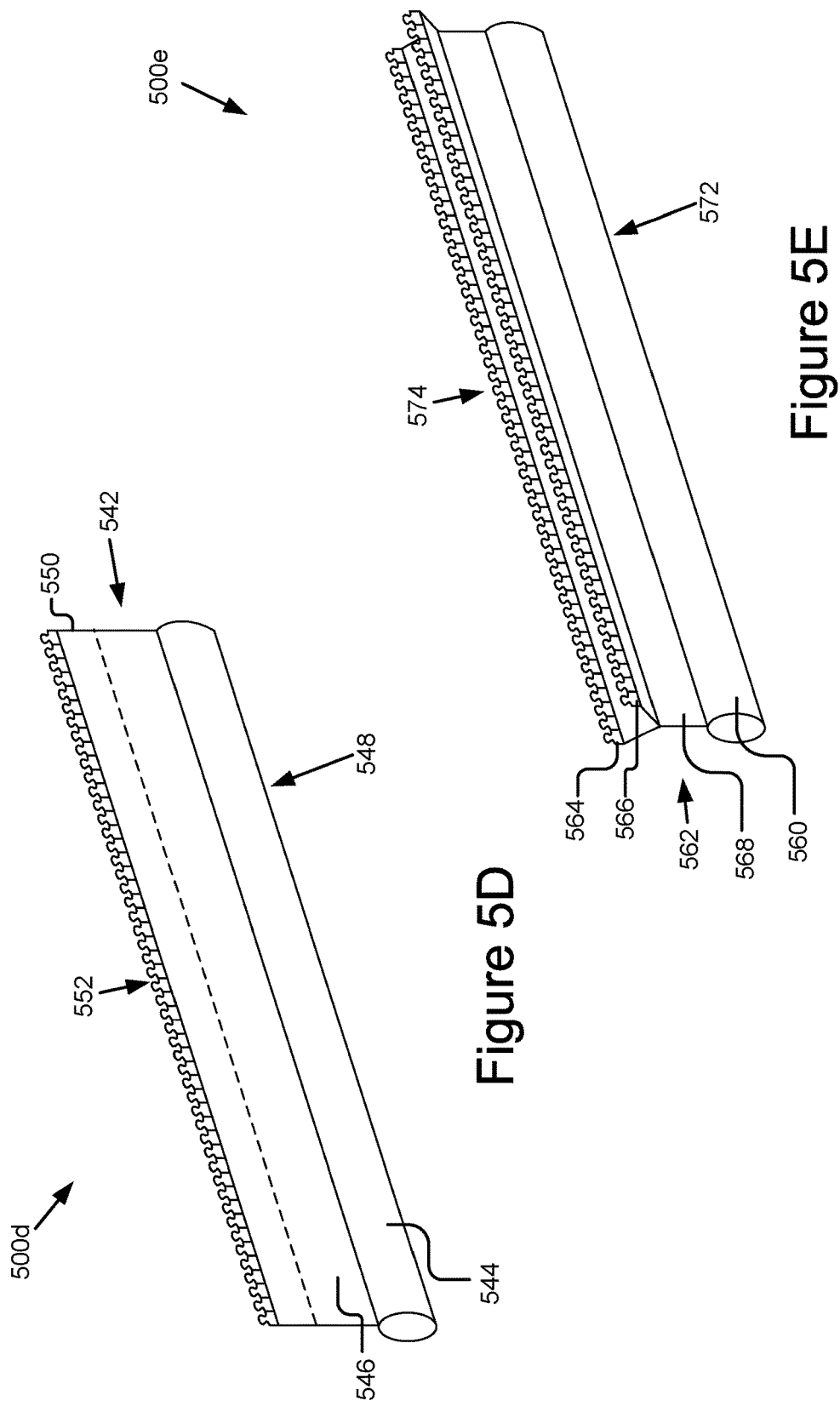

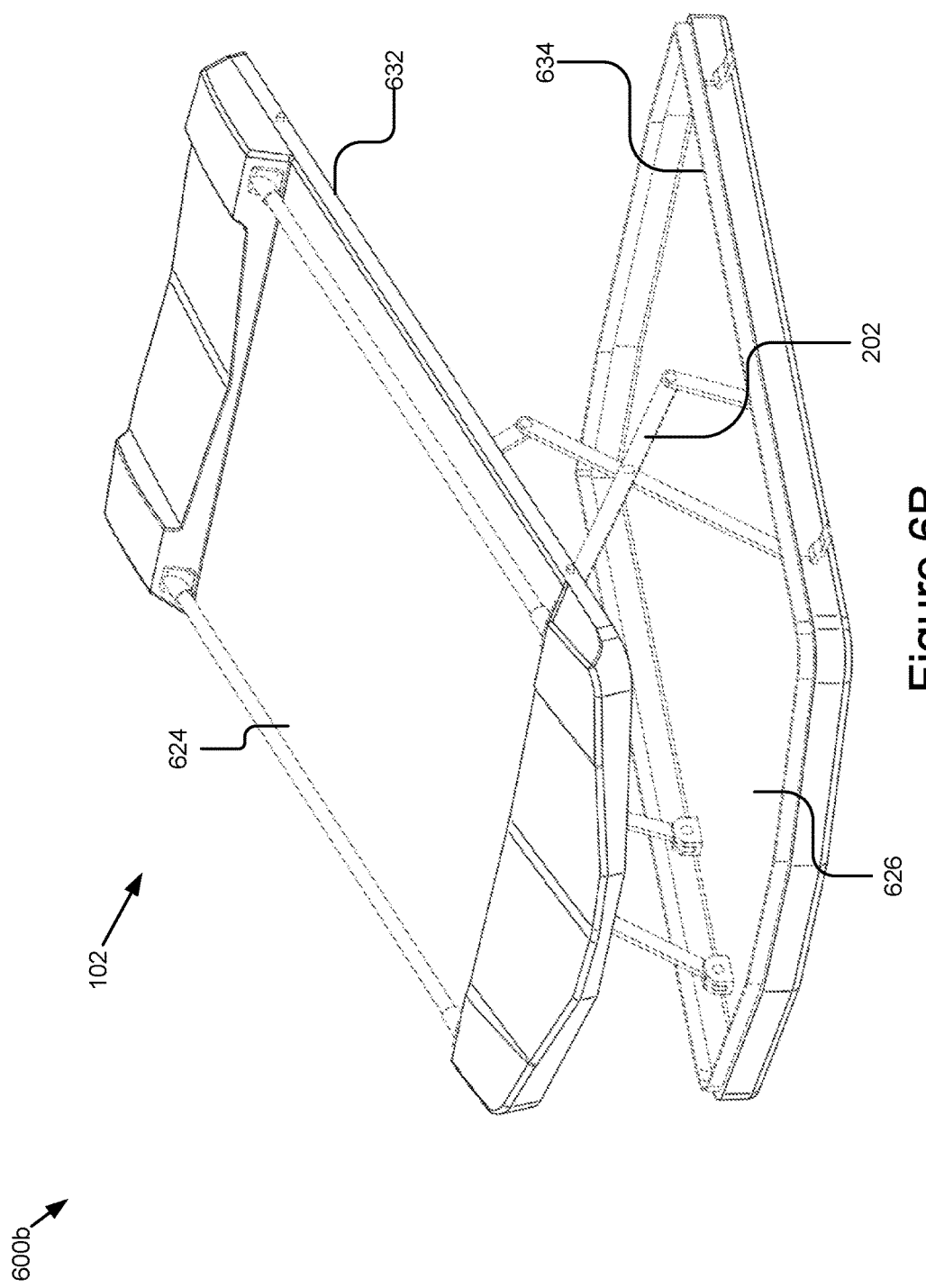

– continued –

HARD SHELL ROOFTOP TENT WITH UTILITY RAILS

CROSS-REFERENCE TO RELATED APPLICATIONS

This application is a continuation of U.S. application Ser. No. 15/625,659, entitled "Hard Shell Rooftop Tent with Utility Rails," filed on Jun. 16, 2017, which is a continuation-in-part of U.S. application Ser. No. 15/254,961, entitled "Adaptable Tent System with Interconnecting Member," filed on Sep. 1, 2016, which claims the benefit of U.S. Provisional Application No. 62/213,600, entitled "Gimp with Zipper for interchanging a tent base platform with the tent canopy. The Gimp is constructed of the same or similar material to the tent and attached to the base. The Gimp has a zipper on the non-base side. The Gimp allows a person to remove the tent canopy from the tent base simply by unzipping along the perimeter. The Gimp can also be used for an annex attached underneath the vehicle tent's base for easy removal. The use of a gimp is in lieu of attaching the tent or annex to base," filed on Sep. 2, 2015. This application also claims the benefit under 35 U.S.C. § 119(e) of U.S. Provisional Application No. 62/351,175, entitled "Hard Shell Roof-Top Tent with Utility Rails," filed on Jun. 16, 2016, the entire contents of each of which are incorporated herein by reference.

BACKGROUND

The present disclosure relates to rooftop tents that are mountable on a vehicle.

Many outdoors enthusiasts enjoy camping, but setting up a tent can be time consuming and inconvenient, especially when there are no suitable places to put a tent. Additionally, it is frequently beneficial to be located off the ground to avoid disturbing or being disturbed by wildlife. A popular solution to such a problem is a rooftop tent that attaches to the top of a vehicle. Unfortunately, current rooftop tents also present various shortcomings. Many existing rooftop racks are not aerodynamic, thereby causing wind resistance and decreasing fuel efficiency. Additionally, existing rooftop tents are frequently attached to a vehicle's roof rails, which prevents other items, such as bicycles, surfboards, and skis from being mounted to the roof rails.

Existing rooftop tents may include a base that can be mounted to a vehicle and a tent fabric permanently affixed to the base. Such existing rooftop tents tend to be difficult to repair and are unable to adapt to various weather conditions or user needs, in part because the tent fabric is difficult to replace.

Accordingly, there is a need among such tents to improve aerodynamics, ease of use, and utility.

SUMMARY

A rooftop tent system is described. According to some implementations, the rooftop tent system includes a first shell member including a first rigid portion defining a first perimeter edge, the first shell member adapted to mount to a roof of a vehicle. The first shell member also includes a second shell member including a second rigid portion defining a second perimeter edge, the second perimeter adapted to mate with the first perimeter edge when the tent system is in a closed position, the first shell member and the second shell member defining an interior cavity when the tent system is in the closed position, the second shell member moving away from the first shell member when the tent system is in an open position. The first shell member also includes one or more utility rails secured to the second shell member, the one or more utility rails adapted to support one or more items on top of the second shell member. The first shell member also includes an articulating mechanism coupling the first shell member to the second shell member, the articulating mechanism bearing against the second shell member to transfer a weight of the second shell member and the one or more utility rails to the roof of the vehicle when the tent system is in the open position, the articulating mechanism adapted to collapse to a first position when the tent system is in the closed position and extend to a second position when the tent system is in the open position.

In general, another innovative aspect of the subject matter described in this disclosure may be embodied in methods that include operations for the use and manufacture of the system above.

It should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

FIGS. 4A and 4B are side views of an example rooftop tent system with an example item mounted on the utility rails.

FIGS. 5A-5E are illustrations of example interconnecting members.

FIGS. 6A-6C are top perspective views of an example rooftop tent system.

DETAILED DESCRIPTION

Figure 1:
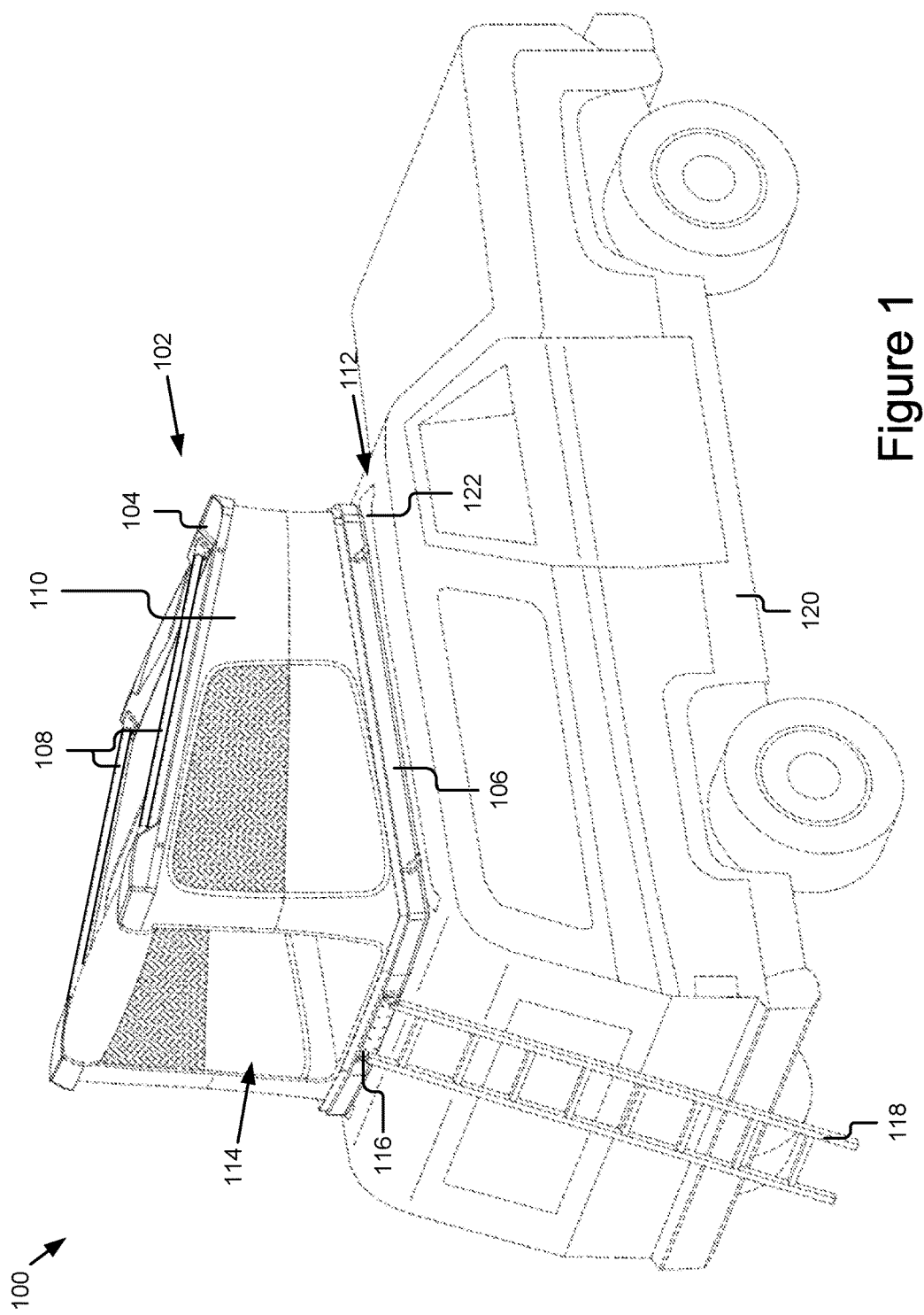
FIG. 1 is a perspective view of an example rooftop tent system in an open position and mounted to a vehicle.

For the purposes of this disclosure, reference numbers may be used to refer to components found in any of the figures, regardless whether those reference numbers are shown in the figure being described. Further, where a reference number includes a letter referring to one of multiple similar components (e.g., component 000a, 000b, and 000n), the reference number may be used without the letter to refer to one or all of the similar components.

The present disclosure describes an innovative technology relating to a rooftop tent system 102 (hereinafter "tent system") for vehicles 120. The tent system 102 may include an aerodynamic hard shell 420 that includes utility rails 108 for mounting items, such as utility roof racks, bicycles, surfboards, skis, kayaks, etc., on top of the tent system 102. It should be further noted that the techniques and systems described herein may be applied to other rooftop systems, such as a vehicle 120 mounted cargo box.

The tent system 102 may include a low profile, rack ready, and versatile hard shell 420. For example, the technologies described herein may allow the tent system 102 to have a low profile (e.g., eight inches thick) while in the closed position, whereas existing soft and hard-shell roof top tents may be substantially thicker (e.g., 50% thicker or 12-13 inches thick) while in a closed position. This low profile, aerodynamic design is made possible, for example, by the shape of the hard shell 420 and the design of its hinges (e.g., the articulating mechanism 202 described herein), among other features.

The tent system 102 may include utility rails 108 that may be integrated with or attached to the top, sides, front, and/or back of the hard shell 420. The articulating mechanism 202 may be configured to include a support or lift assistance mechanism 204 that assists a user to lift or lower the weight of a top half of the hard shell 420, the utility rails 108, and/or items placed on top of the utility rails 108. In some implementations, the lift assistance mechanism 204 may be adjustable or interchangeable so that different weights may be lifted or supported. For example, different interchangeable lift assistance mechanisms 204 with various weight capacities may be used with (e.g., attached to) the hard shell 420 to support a top half of the hard shell 420 as well as bicycles, surfboards, or other items that may be mounted to the utility rails 108.

For example, as discussed in the Background, one of the biggest drawbacks to previous rooftop tents is the fact that people could not bring their gear (e.g., bicycles, skis, or other items) that would typically mount to the roof rails 122 or rooftop rack of their vehicle 120, because the rooftop tents mount to the roof rails 122 or rooftop rack of the vehicle 120 thereby leaving no room for the gear. The technologies described herein may include utility rails 108 mounted on top of the tent system 102 and a lift assistance mechanism 204 that allows a user to open and close the tent system 102 with the gear still supported on the top of the hard shell 420/utility rails 108 rather than have users unload gear attached to the tent system 102 before opening the tent system 102. Accordingly, using the lift assistance mechanism 204 and other components described herein, the tent system 102 may be opened even with potentially heavy items mounted on top of the utility rails 108. For example, lift assistance mechanisms 204 may be removable and interchangeable to support a different amounts of weight. For instance, a user may use one lift assistance mechanism 204 if a surfboard is mounted to the tent system's utility rails 108 and a different (e.g., with a different weight rating) lift assistance mechanism 204 if a bicycle is mounted to the utility rails 108.

In some implementations, the tent system 102 may include a flexible membrane 110 (e.g., tent fabric) and an interconnecting member 506 (e.g., as described in reference to FIGS. 5A-5E) for detachably coupling the tent fabric to one or more of the components of the hard shell 420. For example, the interconnecting member 506 allows a hard shell 420 and tent fabric (e.g., the flexible membrane 110 described herein) to be easily separable so that the tent fabric can be easily replaced, repaired, and/or stored. In some implementations, due to the interchangeable nature of components of the interconnecting member 506, multiple tent fabrics can be interchangeably or simultaneously mounted to the hard shell 420 to provide adaptability to various weather conditions or user needs.

The hard shell 420, utility rails 108, articulating mechanism 202, lift assistance mechanism 204, interconnecting member 506, and other components of the tent system 102 are described in further detail throughout this disclosure.

Figure 2:
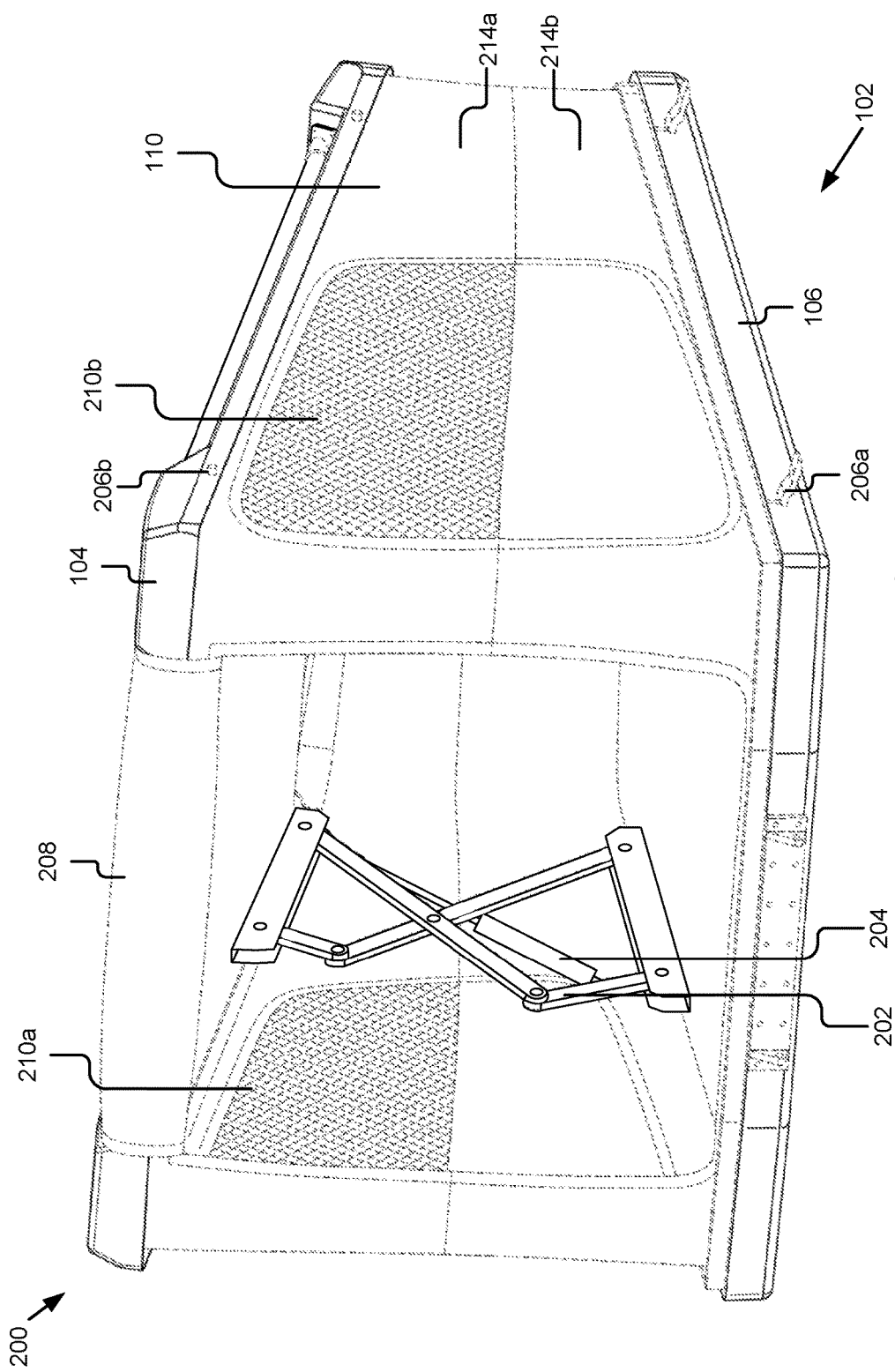
FIG. 2 is a perspective view of an example rooftop tent in an open position.
Figure 6A:
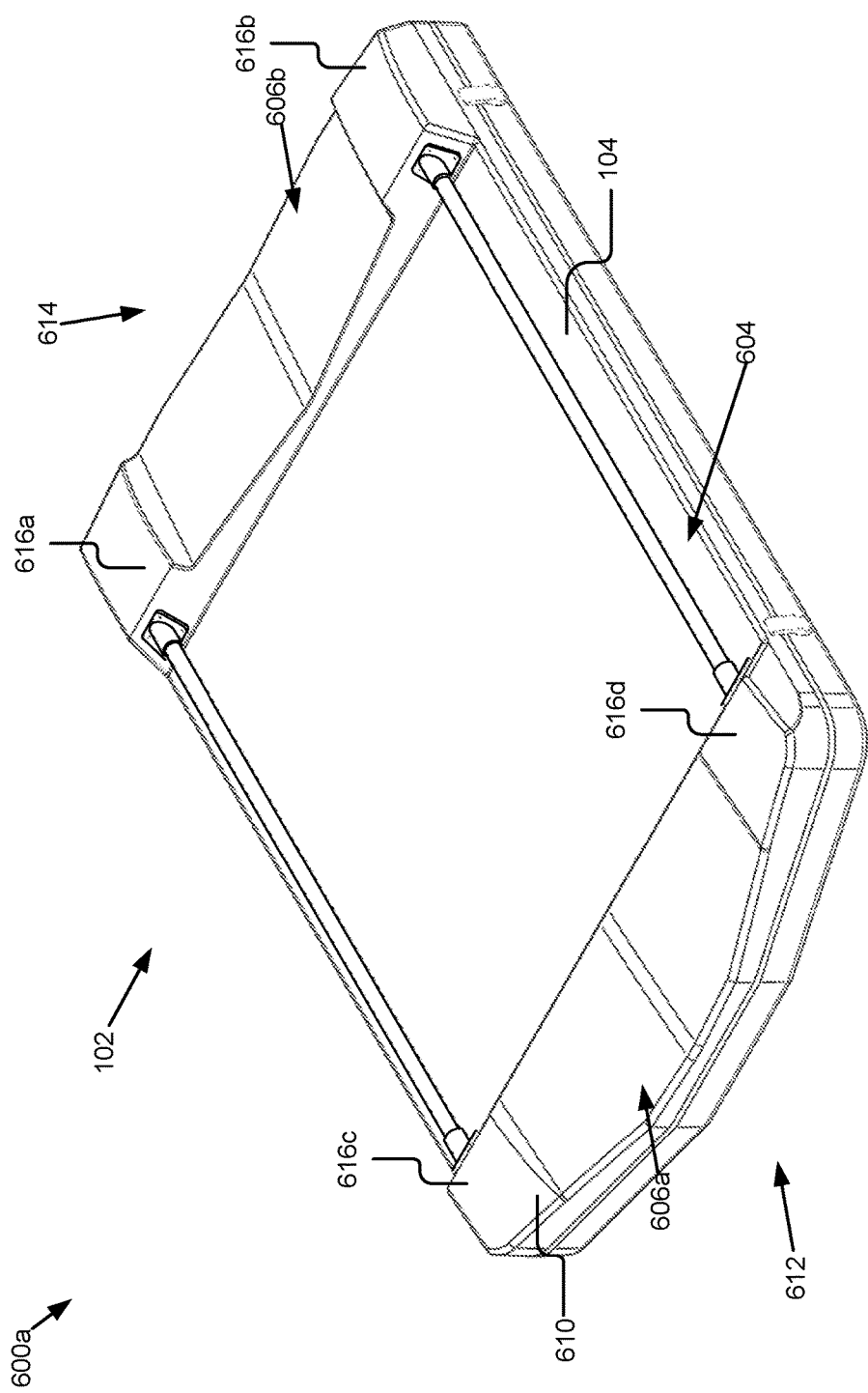

FIG. 1 is a perspective view 100 of an example rooftop tent system 102 in an open position and mounted to a vehicle 120. As illustrated, the tent system 102 may comprise a hard shell 420 with attached utility rails 108. The hard shell 420 may include a bottom shell member 106 adapted to mount to a roof of a vehicle 120 and a top shell member 104 adapted to mate with the bottom shell member 106 when the tent system 102 is in a closed position. The bottom shell member 106 and the top shell member 104 define an interior cavity when the tent system 102 is in the closed position (e.g., as illustrated in FIG. 6A, for example). The top shell member 104 may move away from the bottom shell member 106 when opening the tent system 102 and be held in a given orientation relative to the bottom shell member 106 by the articulating mechanism 202 (e.g., as shown in FIGS. 2 and 6B).

The bottom shell member 106 and/or top shell member 104 of the hard shell 420 may be constructed of substantially rigid material. For example, in some implementations, the hard shell 420 may include fiberglass sandwich construction. Fiberglass sandwich construction allows a high strength to weight ratio, so the tent system 102 may be easily transported and mounted while also being capable of supporting the weight of items attached to its utility rails 108. It should be understood that other materials are possible and contemplated herein, for example, the hard shell 420 may be constructed of other lightweight but strong materials, such as certain types of plastics, carbon fiber, aluminum, steel, etc.

The utility rails 108 may include one or more bars, poles, rails, rods, etc., integrated with or secured to the top shell member 104. For example, the utility rails 108 may include two parallel load bars adapted to receive (e.g., have mounted thereon) a vehicle 120 utility rack or may include an integrated utility rack. In some implementations, the bars may range from plus or minus 6 inches from 36 inches long, although other lengths are possible. In some implementations, the utility rails 108 may replicate vehicle 120 utility rails 108 mounted on or integrated with a vehicle 120. The utility rails 108 may run longitudinally (e.g., with the length of the vehicle 120, as shown in FIG. 1) or transversely (perpendicular to the length of the vehicle 120) on the tent system 102. The utility rails 108 are adapted to support one or more items on top of the top shell member 104, for example, as illustrated and described in reference to FIGS. 4A-4B.

In some implementations, the integrated utility rails 108 may be rack ready (e.g., configured to allow standard, transversely mounted vehicle 120 roof racks to be attached to the utility rails 108). Load bars of the utility rails 108 may be constructed from a different material from the fiberglass shell, such as steel, aluminum, etc. In some implementations, the technologies described herein may allow the utility rails 108 to support a weight in excess of 150 pounds on top of the top hard shell member 104.

As illustrated in FIG. 1, the tent system 102 includes a flexible membrane 110 that extends between the top shell member 104 and the bottom shell member 106 to define an enclosure within the tent system 102 when the tent system 102 is in a deployed or open position. For example, the flexible membrane 110 may form tent sides while the bottom shell member 106 forms a base and the top shell member 104 forms a roof of the tent system 102. The flexible membrane 110 may include any type of expandable, foldable, or flexible material, such as fabric, canvas, mesh, net, vinyl, nylon, polyester, etc.

In some implementations, the flexible membrane 110 may be detachably secured to the bottom 106 and/or top shell members 104 via an interconnecting member 506 (e.g., as described in reference to FIGS. 5A-5E). One of the benefits using the interconnecting member 506 is the ability to use additional, fewer, or different materials to construct the flexible membrane 110 than are used in existing tents. For example, a flexible membrane 110 may be constructed of mesh, and may allow an additional flexible membrane 110 (e.g., constructed of water resistant material) to be attached hard shell 420 in addition to, or in place of, the mesh flexible membrane 110 using the interconnecting member 506.

In some implementations, the tent system 102 may include an attached or attachable ladder 118, which may be deployed over the back or a side of the vehicle 120, depending on the implementation, to enable a person to climb into the tent system 102. In some implementations, the ladder 118 may be attached to the bottom or side of the bottom shell member 106.

In some implementations, the ladder 118 may be coupled to the bottom shell member 106 via a mounting mechanism, such as the ladder bracket 116, a sliding mount, hooks, bolts, adhesive, rivets, or any other suitable mechanism. In some implementations, the ladder 118 may be detachably coupled to the bottom shell member 106 via a ladder bracket 116. In some implementations, the ladder 118 may be slidably coupled to the bottom shell member 106 via a sliding mount (not shown), which enables the ladder 118 to slide into or beneath, for example, the bottom shell member 106. For example, the sliding mount may include a cavity formed by the bottom shell member 106, L channels, C channels (e.g., two channels with openings facing each other), or another mounting mechanism, affixed to or formed by the bottom shell member 106 into which all or a component of the ladder 118 may slide and lock in place when the ladder 118 is not in use. It should be noted that other configurations are possible and contemplated, such as where the ladder 118 is pivotally mounted to tent, for example, so that it may fold on top of, underneath, or to the side/back of the tent system 102 when not in use. Similarly, the ladder 118 (and a doorway 114) to the tent system 102 may be placed at a rear (as shown in FIG. 1), side, or other locations on the tent system 102. In some instances, the ladder 118 may be alternatively attachable to one or both of the back of and a side of the vehicle 120 to allow the tent system 102 to mount to a variety of vehicles 120. Further, the ladder 118 may be telescopic to accommodate for different heights of vehicles 120.

FIG. 2 is a perspective view 200 of an example rooftop tent system 102 in an open position. As shown in FIG. 2, the tent system 102 may have a door 208 (shown in an open position draped over the top shell member 104) and two windows 210a and 210b, although other implementations are possible and contemplated. In some implementations, the door 208 may include a flap constructed of the same material as the flexible membrane 110 on the sides and may be openable/closable via zipper. In some implementations, the windows 210 may be constructed of mesh or clear plastic and may include a water resistant membrane or flap to cover the windows for privacy or weather protection. In some implementations, a top portion 214a of the tent sides may be constructed of a lightweight or breathable material, such as mesh, while a bottom portion 214b of the tent sides may be constructed of a heavier material than the top portion 214a, such as canvas, thereby providing privacy, durability, and breathability.

FIG. 2 also illustrates an example articulating mechanism 202. For example, in the illustrated implementation, the articulating mechanism 202 may include a scissor-type hinge where components may slide along the sides of each other to reduce the size of the articulating mechanism 202 when the tent system 102 is in a closed position and extend to attach the top shell member 104 to the bottom shell member 106 when the tent system 102 is in an open position (e.g., as shown in FIG. 2). As illustrated, the articulating mechanism 202 may include or have attached a lift assistance mechanism 204 configured to assist in lifting the second shell member to an open position. For example, the lift assistance mechanism 204 may include a strut that is adapted to support the weight comprising the top shell member 104, the flexible membrane 110, the utility rails 108, and/or items or gear that may be placed on top of the top shell member 104 or utility rails 108.

In some implementations, the articulating mechanism 202 may couple the bottom shell member 106 to the top shell member 104. The articulating mechanism 202 may bear against the second shell member to transfer a weight of the second shell (and items supported by the top shell member 104 or utility rails 108) to the roof 112 of the vehicle 120 when the tent system 102 is in the open position. The articulating mechanism 202 may be adapted to collapse to a first position when the tent system 102 is in the closed position and extend to a second position when the tent system 102 is in the open position. The articulating mechanism 202 and lift assistance mechanism 204 are shown and described in further detail in reference to FIG. 3A.

In some implementations, the tent system 102 may include one or more latches 206a and latch points 206b for holding the hard shell 420 in a closed position (e.g., as shown, for example, in FIG. 6A). For example, a latch 206a may be attached to the bottom shell member 106 and a latch point 206b may be attached to the top shell member 104, although other implementations are possible. The latch 206a attaches to the latch point 206b to securely hold the hard shell 420 in a closed position, especially when there are items mounted to the utility rails 108. In some implementations, the laches 206 may be constructed of a high quality thermoplastic elastomer, metal, or other material.

Figure 3A:
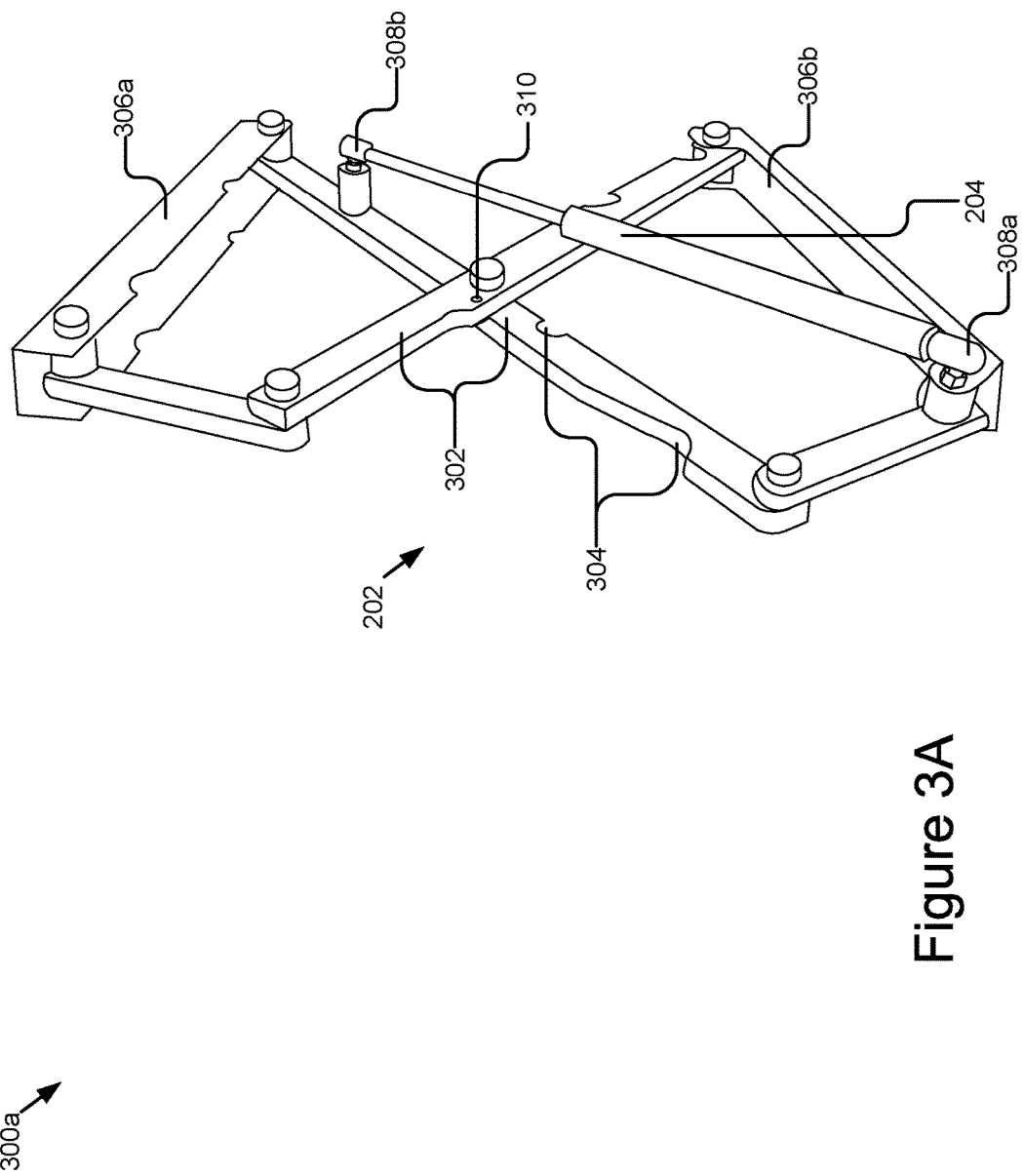
FIGS. 3A and 3B illustrate an example articulating mechanism, lift assistance mechanism, and bracket plate.

FIG. 3A illustrates an example articulating mechanism 202 with an example lift assistance mechanism 204. An articulating mechanism 202 couples the bottom shell member 106 to the top shell member 104 and bears against the top shell member 104 to transfer a weight of the top shell member 104, the utility rails 108, and any items that may be placed thereon to the roof of the vehicle 120 when the tent system 102 is in the open position. The articulating mechanism 202 beneficially allows the tent system 102 to open widely, but close to a low-profile design.

The articulating mechanism 202 may include a scissor-type hinge, a custom designed multi bar hinge linkage, or other configuration. The hinge assembly/linkage may be constructed of steel, aluminum, or other suitably strong materials and may include interchangeable supports, such as a lift assistance mechanism 204. The articulating mechanism 202 may be fixably attached to the bottom shell member 106 and top shell member 104 via one or more mounting brackets 306a and 306b or mounting points. In some implementations, the mounting brackets 306 may be bolted, glued, welded, or otherwise affixed to the bottom shell member 106 or top shell member 104.

Figure 3B:
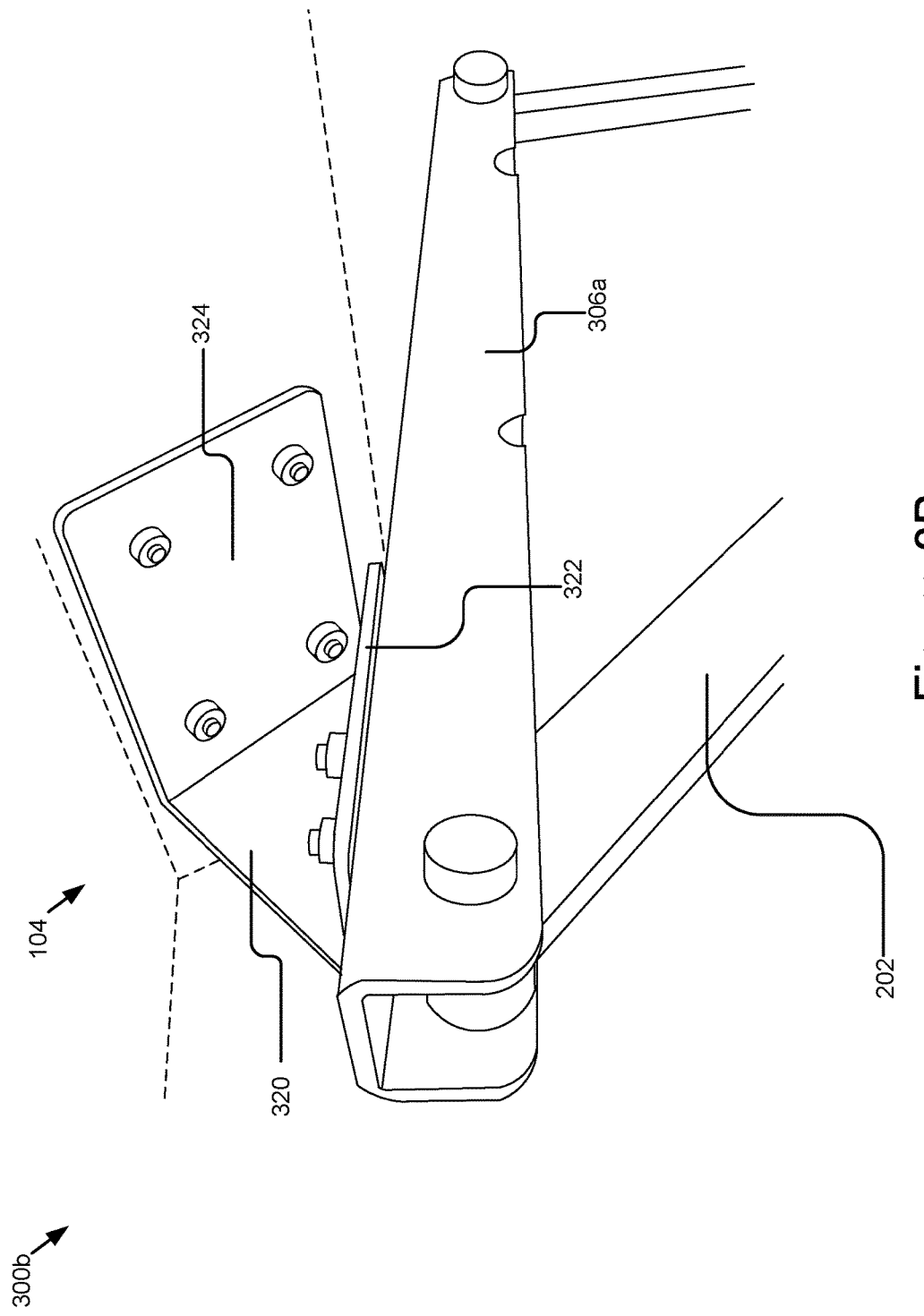

In some implementations, a bottom mounting bracket 306b may be affixed to the bottom shell member 106 and also to mounting hardware (e.g., a bracket or other apparatus affixed to the bottom shell member 106 for mounting the tent system 102 to roof of the vehicle 120). In some implementations, a top mounting bracket 306a may be affixed to the top shell member 104 and to the utility rails 108, for example, via a bracket plate 320, as illustrated in FIG. 3B.

These configurations further strengthen the tent system 102 to enable the tent system 102 and articulating mechanism 202 to support the weight of the utility rails 108 and items placed on top of the utility rails 108.

The articulating mechanism 202 is adapted to collapse to a first position when the tent system 102 is in the closed position and extend to a second position when the tent system 102 is in the open position. For example, various bars 302 of the articulating mechanism 202 may be positioned to slide past one or more of the other bars 302 in the articulating mechanism 202. Further, some of the bars may be notched or shaped 304 to fit other bars or pivot points, so that when the articulating mechanism 202 is in a collapsed/closed position, the entire assembly is compact thereby lowering the profile of the tent system 102 and correspondingly decreasing wind resistance and bulk.

In some implementations, the articulating mechanism 202 is adapted to lock in place when the tent system 102 is in an open position. This may be accomplished using various mechanisms, such as a pin system, a rod extending between points on the articulating mechanism 202 or the bottom and top shell members 104, or other structures for holding the articulating mechanism 202 or hard shell 420 open. For example, as illustrated, a central pivot point (or any other pivot point) of the articulating mechanism 202 may have a hole 310 penetrating the bars 302 that cross at the central pivot point. A user may insert a pin through the hole 310 to lock the articulating mechanism 202 in place.

In some implementations, the articulating mechanism 202 may include a lift assistance mechanism 204 adapted to assist in lifting the top shell member 104 (and, potentially, items supported by the top shell member 104) to an open position. It should be noted that although the lift assistance mechanism 204 is illustrated as including a strut, other implementations are possible, such as a spring, gas ram, electric motor, pulley, etc. The lift assistance mechanism 204 may be removable, and/or interchangeable with one or more other supports having different weight ratings/weight lift capacities, or the lift assistance mechanism 204 may be adjustable to support to lift and/or support various weights.

In some implementations, the lift assistance mechanism 204 is detachably connected to the articulating mechanism 202, bottom shell member 106, and/or the top shell member 104 using ball joints 308a and 308b. The ball joints 308 may have a locking mechanism to attach the lift assistance mechanism 204 to the tent system 102 to allow the lift assistance mechanism 204 to be easily mounted and unmounted from the articulating mechanism 202 (or other mount points), although other implementations and connection types are possible.

FIG. 3B illustrates an example mounting bracket 306a of the articulating mechanism 202 and a bracket plate 320 shown as attached at a bottom surface of a top shell member 104. The bracket plate 320 may couple the mounting bracket 306a, (and therefore the articulating mechanism 202, and in some instances, the lift assistance mechanism 204) to the top shell member 104 and, in some implementations, to the utility rails 108. For example, a first element 322 of the bracket plate 320 may attach to the top mounting bracket 306a and a second element 324 of the bracket plate 320 may attach to the utility rails 108 (or a mounting component of the utility rails 108). For example, a front mount point (not shown in FIG. 3B) of a utility rail 108 may attach to the bracket plate 320 through the top shell member 104 using bolts or some other mechanism, thereby providing further strength to the utility rails 108 and the connection between the utility rails 108 and the top shell member 104.

The bracket plate 320 provides a strong coupling between the utility rails 108 and the articulating mechanism 202. Accordingly, the weight of the utility rails 108 and any items or gear placed on the utility rails 108 may be transferred through the articulating mechanism 202 without putting excessive stress on the top shell member 104. This is beneficial, for example, in implementations where the top shell member 104 tips forward when in an open position, as illustrated in FIGS. 1, 4B, and 6B. In such implementations, the weight of items secured to the utility rails 108 may shift toward the front of the tent system 102, putting additional stress on the coupling between the utility rails 108 and the top shell member 104, which stress may be supported by the bracket plate 320.

Figure 4A:
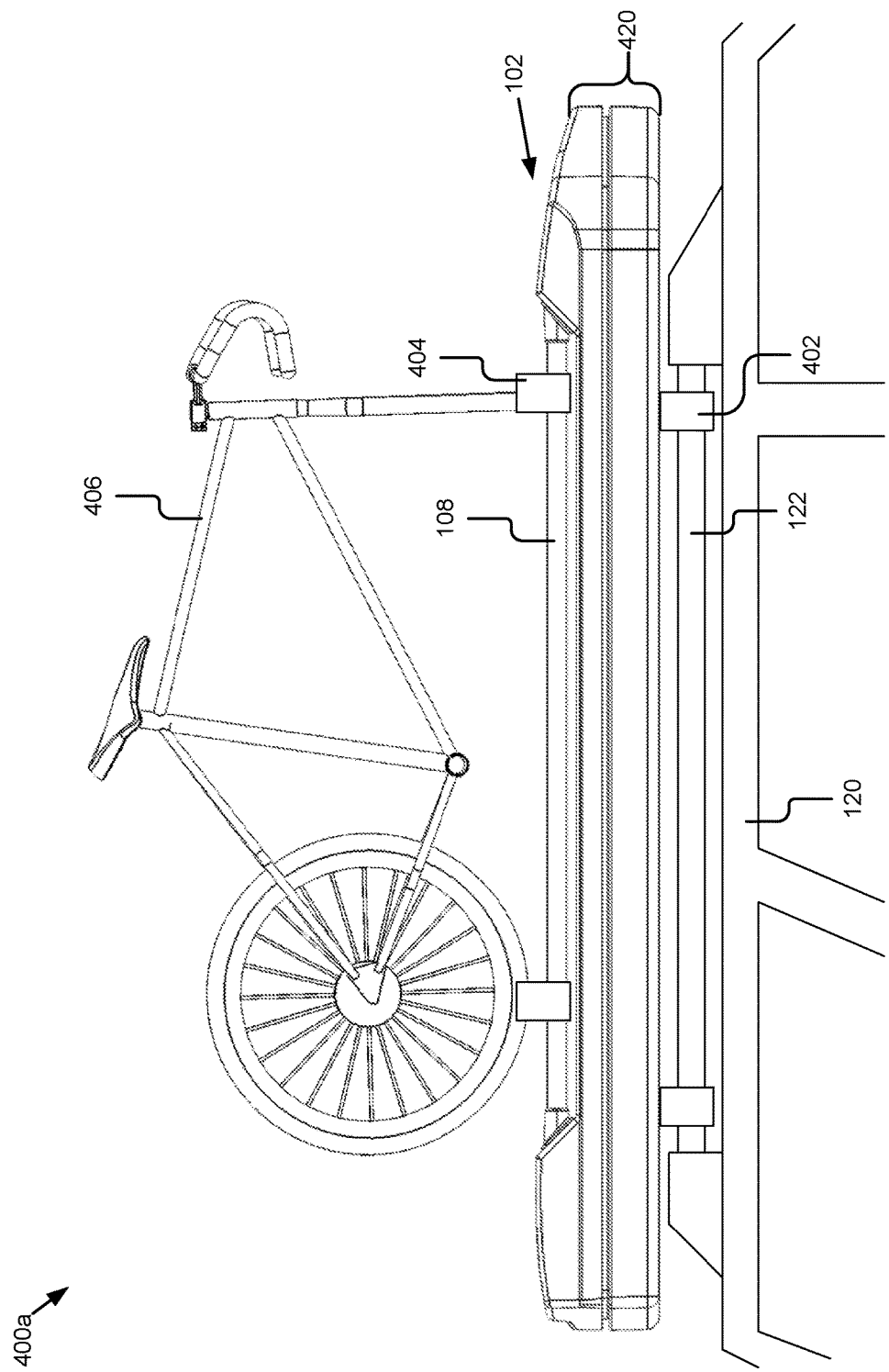

FIG. 4A is a side view 400a of an example rooftop tent in a closed position with an example item 406 mounted thereon. As shown, the tent system 102 is mounted to the roof of a vehicle 120 using mounting hardware 402 for mounting the tent system 102 to the vehicle's 120 roof rails 122. In some implementations, the mounting hardware 402 may include transverse bars or other another mechanism attached (e.g., bolted, formed within, etc.) to the bottom of the bottom shell member 106. For example, the mounting hardware 402 may include a transversely mounted rail, rack, clamps, straps, or other mounting hardware configured to attach the tent system 102 to vehicle roof rails 122.

As shown in the example implementation, the tent system 102 may include utility rails 108 integrated into the top shell member 104, although it should be noted that the integrated utility rails 108 may be attachable or detachable, etc. The utility rails 108 may support items directly or via an integrated or attachable utility/roof rack 404. The roof rack 404 may be bicycle, ski, or other specialized rack. For example, the roof rack 404 may include transversely mounted rails that may attach items 406 or include attachments configured to attach items 406, such as bicycles, skis, or surfboards. Further, as shown in FIG. 4A, the utility rails 108 have an item 406 mounted using an optional roof rack 404. As illustrated, the item 406 includes a bicycle, but one or more of other or additional items 406 may be mounted, such as bicycles, surfboards, kayaks, cargo boxes, etc.

FIG. 4B is a side view 400b of an example rooftop tent system 102 in an open position with an example item 406 mounted thereon. As illustrated in the side view 400b, the tent system 102 may be deployed in an open position while an item 406 is still attached to the utility rails 108. For example, a lift assistance mechanism 204 (not shown in FIG. 4B) may have a given weight rating adapted to support the top shell member 104, the utility rack 404, and a particular item 406, such as the illustrated bicycle, to help a user open the hard shell 420 while the item 406 remains mounted to the utility rails 108.

In some implementations, the articulating mechanism 202 (and, for instance, the flexible membrane 110, the lift assistance mechanism 204, or other components of the tent system 102) may be configured so that the top shell member 104 tips forward (or another direction) away from a doorway 114, as illustrated in FIG. 4B. The feature where the top shell member 104 tips forward (e.g., is not parallel with the bottom shell member 106) provides additional headroom near the doorway 114 and ladder 118 for ease of ingress/egress. In implementations where the top shell member 104 tips forward, as shown in FIG. 6B, the articulating mechanism 202 may be positioned forward on hard shell 420 or otherwise configured to support the weight of the top shell member 104 and/or any items mounted thereon when the tent system 102 is in an open position (e.g., so the top shell member 104 is tipped forward). It should be noted that the top shell member 104 may alternatively remain parallel with the bottom shell member 106.

Figure 5A:
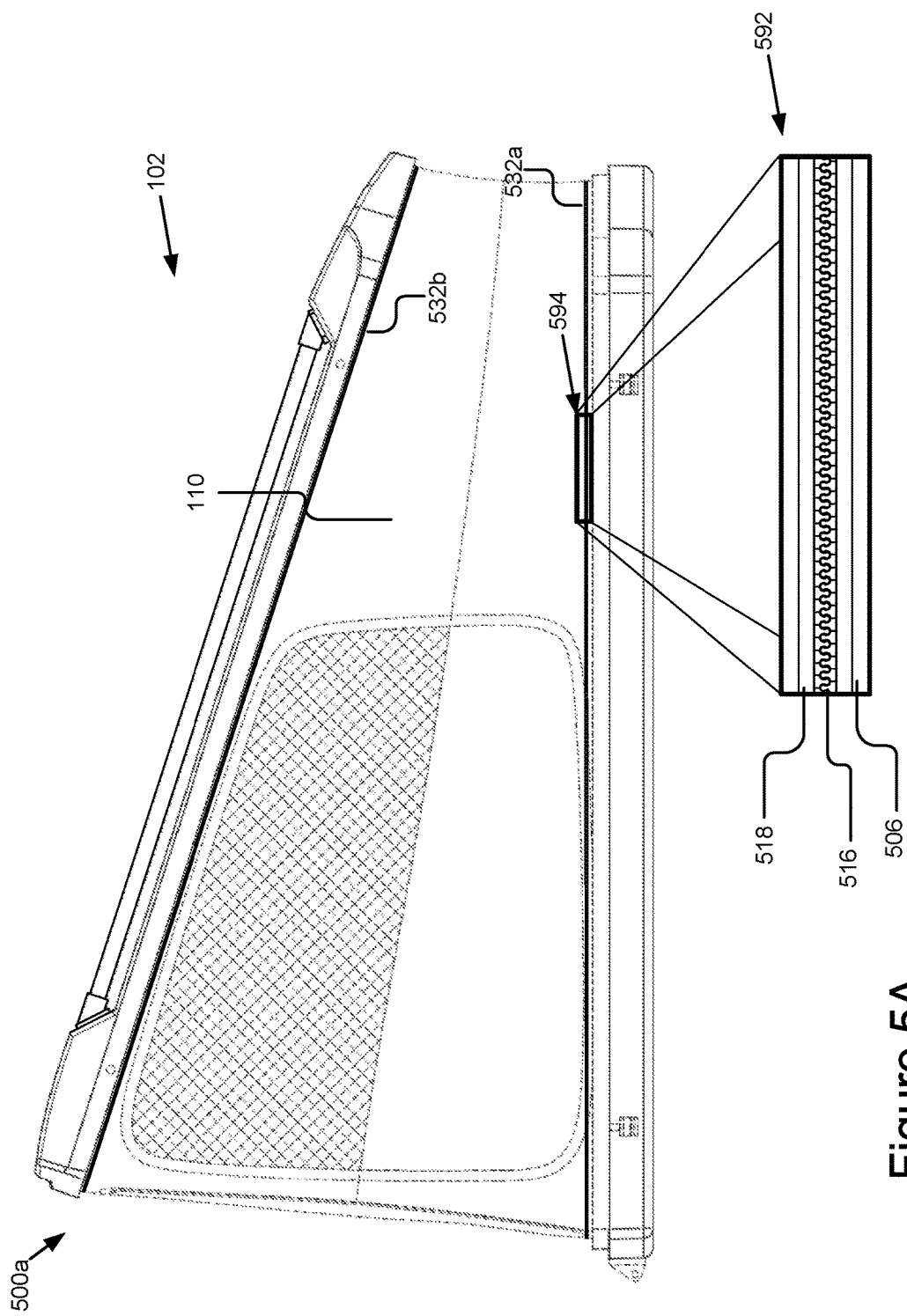

FIG. 5A is a side view 500a of the tent system 102 in an open position with a magnified view 592 of a portion 594 of the tent system 102. As illustrated, the flexible membrane 110 includes a first flexible membrane fastener 518 extending along and fixably attached to a first membrane edge 532a and/or a second flexible membrane fastener 518 (the second flexible membrane fastener 518 may be configured in the same way as the first flexible membrane fastener 518, so the description of the membrane fasteners are combined) extending along and fixably attached to the second membrane edge 532b. The flexible membrane fastener 518 may detachably affix to an interconnecting member fastener 516 of an interconnecting member 506. The interconnecting member 506 may, in turn, be attached to an edge of a bottom shell member 106 or top shell member 104 (e.g., a first interconnecting member 506 may be attached to a bottom shell member 106 and a second interconnecting member 506 may be attached to a top shell member 104). The detachable coupling between the flexible membrane fasteners 518 and the interconnecting member fasteners 516 (and thereby the hard shell 420) enables the flexible membrane 110 to be easily exchanged with other flexible membranes 110 for repair, adaptation to varying weather, etc.

In some implementations, the interconnecting member fastener 516 and flexible membrane fastener 518 may each include a half of a zipper; however, it should be noted that other implementations for fastening the flexible membrane 110 to the interconnecting member 506 are possible and contemplated herein. The interconnecting member 506 and the fasteners are described in further detail in reference to FIGS. 5B-5E. Further details and implementations of the interconnecting member 506 and associated components are described in reference to U.S. patent application Ser. No. 15/254,961, filed on Sep. 1, 2016, the entire contents of which is incorporated by reference herein.

FIG. 5B is a perspective view 500b of an example implementation of an interconnecting member 506 mated to a flexible membrane fastener 518, according to the present disclosure.

The view 500b shows a section of the membrane edge 532 of the flexible membrane 110 attached to the flexible membrane fastener 518. The flexible membrane fastener 518 is a fastener that detachably affixes the flexible membrane 110 to the interconnecting member 506. In the depicted implementation, the flexible membrane fastener 518 includes a flexible membrane zipper half 512 extending along and fixably attached to the membrane edge 532. A flexible membrane zipper half 512 may include a zipper tape 502 and a series of zipper teeth 504 (also known as zipper elements) extending along and fixably attached to the zipper tape 502. The flexible membrane fastener 518 may be adapted to mate with the interconnecting member fastener 516. For example, as depicted, the interconnecting member fastener 516 includes an interconnecting member zipper half 514, which mates with the flexible membrane zipper half 512.

In some implementations, a special zipper may be used for the flexible membrane zipper half 512 and/or the interconnecting member zipper half 514. Many zippers are built such that one zipper half must always mate with a unique second zipper half. In such zippers, each zipper half may have a different number of zipper teeth for a given length of zipper tape, which may be true even of zipper halves that are designed to mate. For example, two zipper halves may only match up with each other, but not with other zipper halves with the same size teeth. Because each zipper half does not have the same or similar number of teeth for the same or similar length of zipper tape, as zipper halves are mated, the overall length of each zipper half may not match. This problem is particularly pronounced on a long zipper, such as may be included on the interconnecting member 506. Accordingly, a special zipper may be used so that the zipper halves, as described herein, may be interchangeable. For example, each of the flexible membrane zipper half 512 and the interconnecting member zipper half 514 may be manufactured such that they are each interchangeable with other zipper halves of similar tooth size without significantly altering the overall zipper length when the two unrelated halves are joined together. One example of zipper halves that may be used to allow interchangeability may be the Musi™ zipper made by the YKK® company, however, it should be noted that other manufacturers may also make suitable zipper halves that allow interchangeability.

It should be noted that, although the flexible membrane fastener 518 and the interconnecting member fastener 516 are described as including a zipper/zipper halves, the fasteners may include other suitable fasteners, such as Velcro, magnets (e.g., a string of magnetic snaps, a magnetic strip, etc.), a series of snaps, a series of buttons, or any other suitable quick release mechanism.

The interconnecting member 506 illustrated in FIG. 5A-5E may include an interconnecting member fastener 516, an interconnecting member body 520, and an attachment member 508. The interconnecting member body 520 may have a rectangular shape defining a first longitudinal edge 548 and a second longitudinal edge 552. The attachment member 508 may be attached to the interconnecting member body 520 along the first longitudinal edge 548 and the interconnecting member fastener 516 may be attached to the interconnecting member body 520 along the second longitudinal edge 552.

The interconnecting member body 520 may be constructed of the same or similar material as the flexible membrane 110 or the interconnecting member body 520 may be constructed of a different material that is strong enough to bind the attachment member 508 to the interconnecting member fastener 516 (as well as resist any tension placed on the interconnecting member 506 from by the flexible membrane 110 or hard shell 420). For example, the interconnecting member body 520 may be constructed of fabric, canvas, mesh, vinyl, nylon, polyester, etc. In some instances, the interconnecting member body 520 may be reinforced with additional layers of material and/or may be treated for weather resistance.

The interconnecting member body 520 may have various sizes depending on the implementation. For example, the width of the interconnecting member body 520 (e.g., the distance between the first longitudinal edge 548 and the second longitudinal edge 552) may be 1-4 inches, although other implementations are possible.

In some implementations, the length of the interconnecting member body 520 may correspond to the distance along the perimeter edge 632 or 634 of one or more of the bottom shell member 106 and top shell member 104, depending on the implementation.

In some instances, the tent system 102 may also include two or more additional interconnecting members 506 for attaching an additional flexible membrane 110, portion of a flexible membrane 110, cover, or annex. It should be noted that other lengths and widths are possible without departing from the scope of the techniques described herein.

The attachment member 508 is configured to attach or otherwise connect with the hard shell 420. For example, the attachment member 508 may be attached to the interconnecting member body 520 along a first longitudinal edge 548. In some implementations, the attachment member 508a may be configured for insertion or other interaction with an attachment member receptacle (not shown). An attachment member receptacle may include a groove or channel defined by or attached along the perimeter edge 632 or 634 into which the attachment member 508a may be received. For example, the attachment member 508 may be sized for insertion into an attachment member receptacle, so that when the attachment member 508a is inserted into the attachment member receptacle, the attachment member 508a and one or more of the top shell member 104 and the bottom shell member 106 are fixably attached together. In some instances, the fit of the attachment member 508 and the attachment member receptacle may be tight enough to form a watertight seal.

In some implementations, the attachment member 508a may include adhesive, screws, clamped fabric, a bolt cord 544, or other means of attaching the interconnecting member body 520 to the bottom shell member 106 or top shell member 104. In some implementations, the attachment member 508a may include a bolt cord 544 or welt cord. For example, the attachment member 508a may include a cord sewn into or otherwise connected to a longitudinal edge 548 of the interconnecting member body 520. Suitable materials for the cord may include a rope, a plastic or rubberized strand, cloth piping, roll of fabric, etc.

The interconnecting member fastener 516 may be any fastener configured to attach the interconnecting member body 520 to the flexible membrane 110 (e.g., to the flexible membrane fastener 518). The interconnecting member fastener 516 may be configured to mate with any one of a plurality of different flexible membrane fasteners 518, so that when the interconnecting member fastener 516 and flexible membrane fastener 518 are mated, the interconnecting member 506 and flexible membrane 110 are detachably, but securely, connected. The interconnecting member fastener 516 may be attached to the interconnecting member body 520 along the second longitudinal edge 552 of the interconnecting member body 520.

In the implementation depicted in FIG. 5B, the interconnecting member fastener 516 may include an interconnecting member zipper half 514. The interconnecting member zipper half 514 may have a zipper tape 522 and a series of zipper teeth 504 extending along and fixably attached to the zipper tape 522. The interconnecting member zipper half 514 may be configured to attach to any one of a plurality of different flexible membrane zipper halves 512. Accordingly, one or more different flexible membranes 110 may interchangeably connected to the interconnecting member 506. For example, the interconnecting member zipper half 514 may be of the special zipper types described above in reference to the flexible membrane zipper half 512.

FIG. 5C is a perspective view 500c of an example implementation of an interconnecting member 506 mated to a flexible membrane fastener 518, according to the present disclosure. The interconnecting member 506 illustrated in FIG. 5C is the same as that described in reference to FIG. 5B, however the attachment member 508b is illustrated as a different configuration. For example the attachment member 508b illustrated in FIG. 5C may be adapted to be sewn, glued (e.g., using adhesive), or otherwise attached to the bottom shell member 106 and/or top shell member 104. For instance, the attachment member 508b may be glued along a perimeter edge of one or both of the bottom shell member 106 and the top shell member 104.

FIG. 5D is a perspective view 500d of an example implementation of an interconnecting member 506, according to the present disclosure. As described above, the interconnecting member 506 may be a gimp 542, which includes a bolt cord 544. The bolt cord 544 may include a cord longitudinally attached to the gimp body 546 along a first longitudinal edge 548. The bolt cord 544 may be adapted for insertion into an attachment member receptacle of the hard shell 420. For example, the bolt cord 544 may interact with a bottom or top shell member 104 by sliding into an attachment member receptacle attached to a perimeter edge of the bottom or top shell member 104. In some implementations, because the bolt cord 544 may be difficult to slide into and/or out of an attachment member receptacle, the bolt cord 544 may be attached to the bottom shell member 106 or top shell member 104 at the factory and may not be easily removable by a user. Moreover, although the attachment member 508 may be another mechanism than a bolt cord 544, as described above, the attachment member 508 may generally be a permanent or semi-permanent installation, so that it is difficult to easily or quickly remove from the hard shell 420, or install and align on the hard shell 420.

Further, as described above, the gimp 542 may include an interconnecting member fastener, such as a gimp zipper half 550 longitudinally attached to the gimp body 546 along the second longitudinal edge 552. An interconnecting member zipper half, such as the gimp zipper half 550 allows the flexible membrane 110 to be quickly attached or removed from the hard shell 420. Further the gimp zipper half 550 automatically aligns and securely attaches the flexible membrane 110 to the bottom shell member 106 or top shell member 104.

FIG. 5E is a perspective view 500e of an example implementation of an interconnecting member 562 (which is an implementation of the interconnecting member 506), according to the present disclosure. The interconnecting member 562 may include an attachment member 560 along a first longitudinal edge 572 of an interconnecting member body 568. The interconnecting member 562 may include a first interconnecting member fastener 564 and a second interconnecting member fastener 566 each attached to interconnecting member body 568 along a second longitudinal edge 574. Similar to the interconnecting member fastener 516 described elsewhere herein, the second interconnecting member fastener 566 may include an interconnecting member zipper half 514 with zipper tape 522 and series of zipper teeth 504 fixably attached to the zipper tape 522.

The second interconnecting member fastener 566 may be configured to mate with any one of a plurality of different flexible membrane fasteners 518. For example, the second interconnecting member fastener 566 may mate with a second flexible membrane 110 (e.g., having a second flexible membrane fastener 518, which may include a second flexible membrane 110 defining a second membrane edge 532 and a second flexible membrane fastener 518, as described above). For example, the first interconnecting member fastener 564 may connect a first flexible membrane 110 (e.g., a mesh or lightweight flexible membrane 110) and the second interconnecting member fastener 566 may connect a second flexible membrane 110 (e.g., a rainfly, weather resistant, insulating, or other flexible membrane 110).

In some implementations, the first interconnecting member fastener 564 and the second interconnecting member fastener 566 may be different lengths, so that the first interconnecting fastener 564 may mate with a first configuration of a flexible membrane 110 and the second interconnecting member 566 may mate with a cover or a second configuration of a flexible membrane 110 (e.g., a water-resistant or solid flexible membrane 110, etc.). For example, in some implementations, the first interconnecting fastener 564 may be configured to extend along three sides of a perimeter edge 632 or 634, but the second interconnecting fastener 566 may be configured to extend along four sides of a perimeter edge 632 or 634.

FIG. 6A is a top perspective view 600a of an example rooftop tent system 102 in a closed position. As illustrated in FIG. 6A, the hard shell 420 has a generally rectangular shape. The rectangular shape maximizes the interior volume of the tent system 102, while fitting conveniently on the top of a vehicle 120. As illustrated, the tent system 102 has a low-profile design thanks to features such as the recessed areas 604 and 606, the articulating mechanism 202 (not shown in FIG. 6A), and the shape of the hard shell 420.

FIG. 6A illustrates that the tent system 102 may have an aerodynamically sloped top portion 610 near the front end 612 of the tent system 102. The top shell member 104 may further have a recessed area 604 on the top to accommodate the utility rails 108 and/or any items (not shown) that may be attached to the utility rails 108. Further, in some implementations, the top shell member 104 may have aerodynamically designed recesses 606a and 606b running between the front end 612 and the back end 614 of the tent system 102. In some implementations, the top shell member 104 may form or have attached thereto raised support areas 616a, 616b, 616c, and 616d that support the utility rails 108. It should be noted that the recesses and/or raised support areas 616 described and shown are provided by way of example and should not be construed as limiting.

The tent system 102 may be designed to fit conveniently on the roof of a vehicle 120. For example, the tent system 102 may be sized so that its mounting hardware (e.g., racks, clamps, straps, etc., attached to the bottom or sides of the tent system 102) securely attaches to roof rails on the top of a vehicle 120. Similarly, the tent system 102 may be sized to balance its mountability on an average or specific vehicle 120 with an ability to provide sufficient interior space. According to some implementations, the dimensions of the tent system 102 may be 78-86 inches long, 50-60 inches wide, 38-46 inches tall when open, and 7-10 inches thick when closed. It should be noted that these dimensions may vary by three to six inches or more, depending on the implementation. It should further be understood that the systems and techniques described herein are applicable to tents and storage containers of many sizes and shapes.

In some implementations, the tent system 102 (or portions thereof, such as a top of the tent system 102) may be colored white or a similar light/heat reflecting color to prevent the tent system 102 from becoming hot. It is beneficial to prevent the tent system 102 from becoming hot to avoid compromising the material (e.g., fiberglass, plastic, etc.) that the hard shell 420 may be made out of. Additionally, it is desirable that the interior of the tent system 102 not become too warm for user comfort.

FIG. 6B is a top perspective view 600b of an example rooftop tent in an open position and without a flexible membrane 110 attached thereto. As illustrated in FIG. 6B, the top shell member 104 and the bottom shell member 106 may be individual components where the top shell member 104 moves away from the bottom shell member 106 when the tent system 102 is in an open position (e.g., as illustrated in FIG. 6B). As illustrated, the bottom shell member 106 includes a first rigid portion 626 that defines a first perimeter edge 634 and the top shell member 104 includes a second rigid portion 624 that defines a second perimeter edge 632. The first perimeter edge 634 and the second perimeter edge 632 may be adapted to mate when the tent system 102 is in a closed position, such that the bottom shell member 106 and the top shell member 104 define an interior cavity when the tent system 102 is in the closed position (e.g., as illustrated in FIG. 6A).

As illustrated, an articulating mechanism 202 may couple the bottom shell member 106 to the top shell member 104 and may bear against the top shell member 104 to transfer a weight of the top shell member 104 and the utility rails 108 to the bottom shell member 106 and/or the roof of the vehicle 120 when the tent system 102 is in the open position.

Figure 6C:
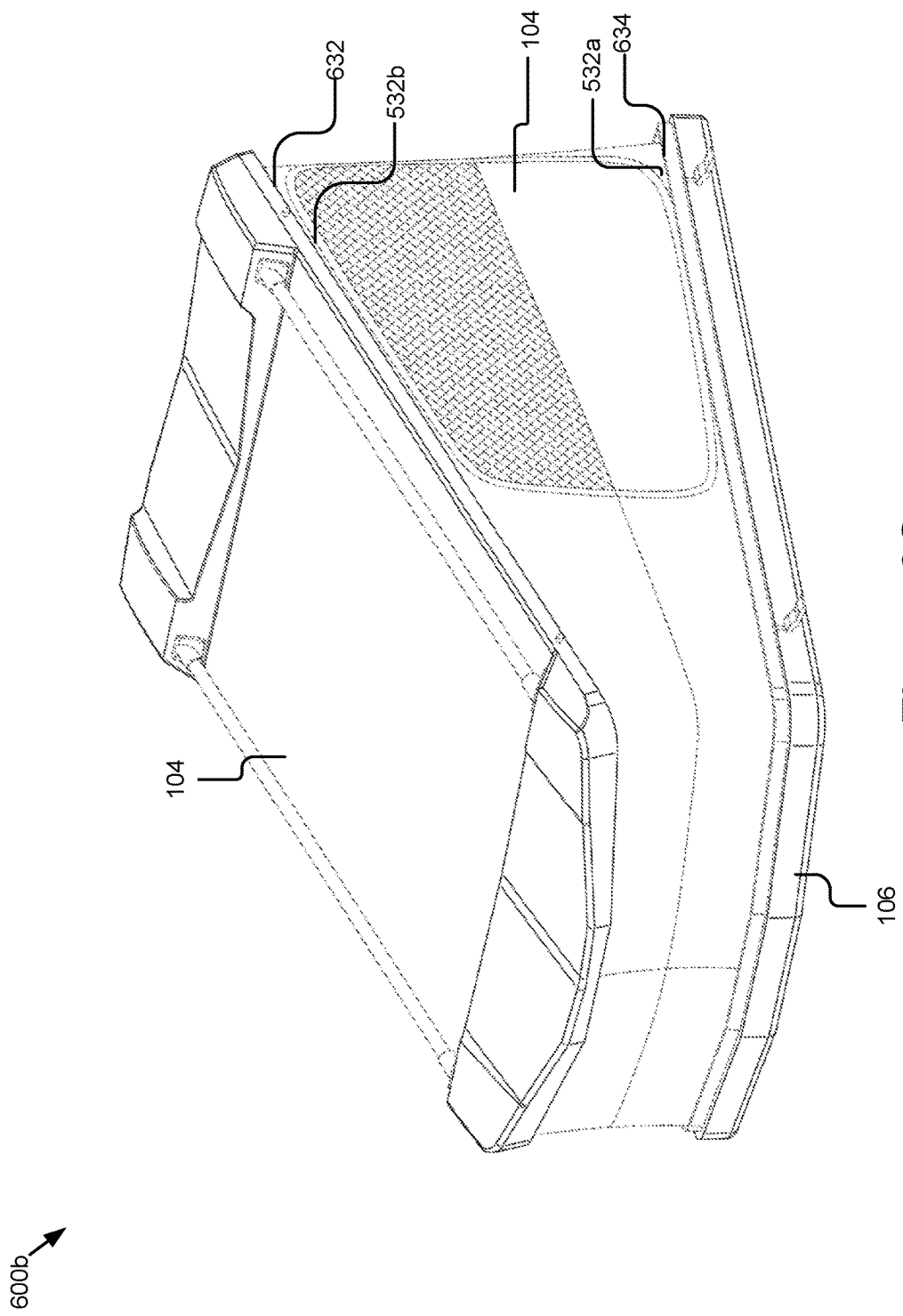

FIG. 6C is a top perspective view 600c of an example rooftop tent system 102 in an open position and with a flexible membrane 110 attached thereto. As illustrated, the flexible membrane 110 may extend between a first section of the first perimeter edge 634 of the bottom shell member 106 and a second section of the second perimeter edge 632 of the top shell member 104. For example, a first membrane edge 532a of the flexible membrane 110 may be adapted to connect to the first perimeter edge 634, and a second membrane edge 542b of the flexible membrane 110 may be adapted to connect to the second perimeter edge 632. In some implementations, the first membrane edge 532a and/or the second membrane edge 532b may include a flexible membrane fastener 518 (not shown in FIG. 6C), and the first perimeter edge 634 and/or the second perimeter edge 632 may include or have attached thereto one or more interconnecting members 506 (not shown in FIG. 6C) with interconnecting member fasteners 516 configured to detachably fasten to the flexible membrane fasteners 518.

Figure 7A:
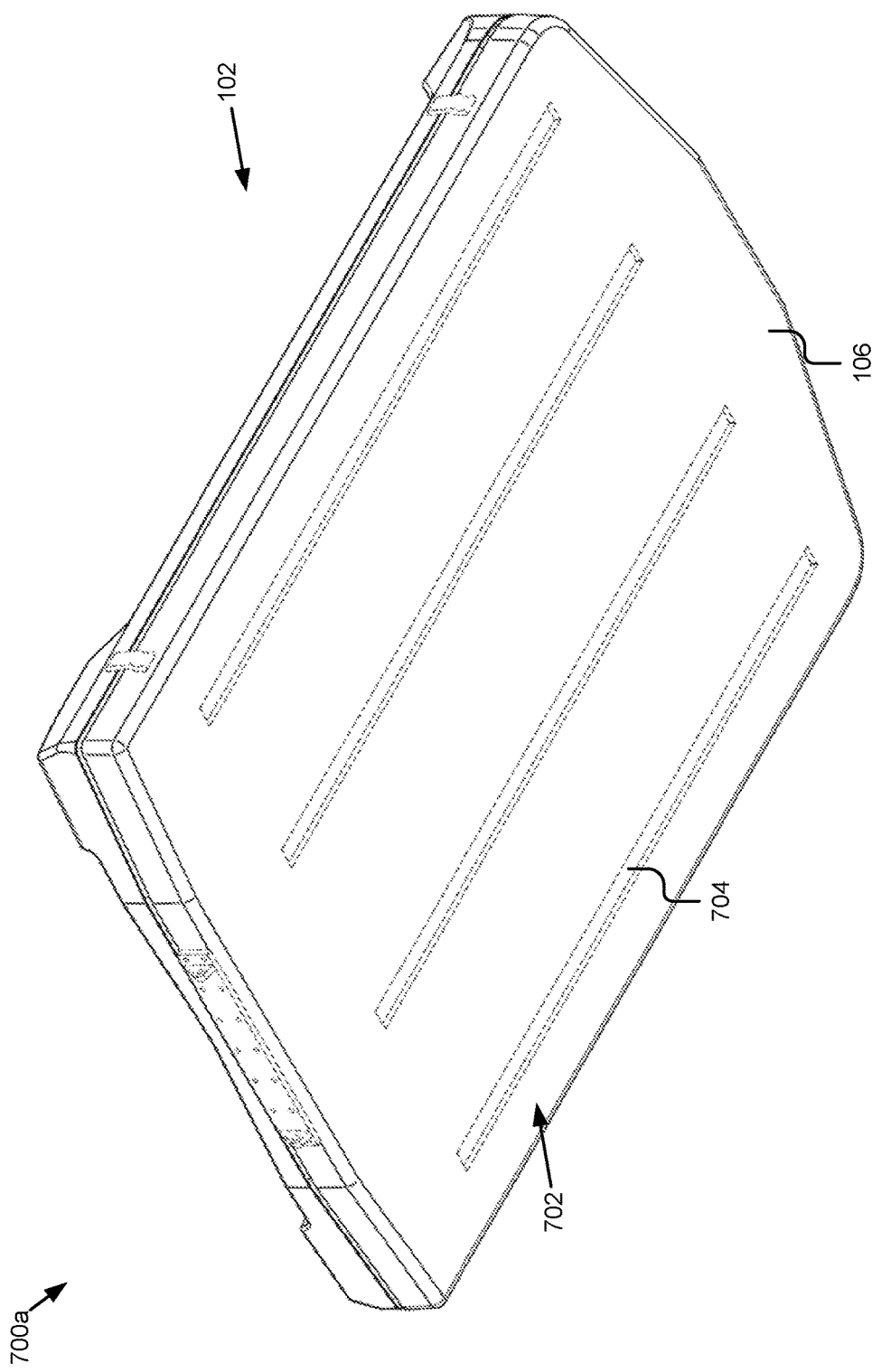
FIGS. 7A-7B are bottom perspective views of an example rooftop tent system.

FIG. 7A is a bottom perspective view 700a of an example rooftop tent system 102 in a closed position. The bottom 702 of the tent system 102 illustrates that the bottom shell member 106 may have one or more corrugations or elongated structures 704. The elongated structures 704 may include grooves into the bottom 702 (e.g., of the bottom shell member 106) or protrusions from the bottom 702 of the tent system 102. Protrusions (e.g., attached to the bottom shell member 106 or integrated with the structure of the bottom shell member 106) are less likely to impinge on the interior volume of the tent system 102 than grooves into the bottom 702 of the tent system 102. In some implementations, the elongated supports 704 may be configured to smooth out airflow along the bottom 702 of the tent system 102. The elongated supports 704 may also, or alternatively, provide rigidity to the bottom shell member 106 of the tent system 102, thereby better supporting the weight of a person within the tent system 102.

Although not shown in FIG. 7A, the bottom 702 may include mounting hardware, such as a bracket or cross members that extend between the left and right side (e.g., transverse or perpendicular to the elongated structures 704). The bracket or cross members may add rigidity to the bottom shell member 106 and/or facilitate mounting the tent system 102 to roof rails of a vehicle 120.

Figure 7B:
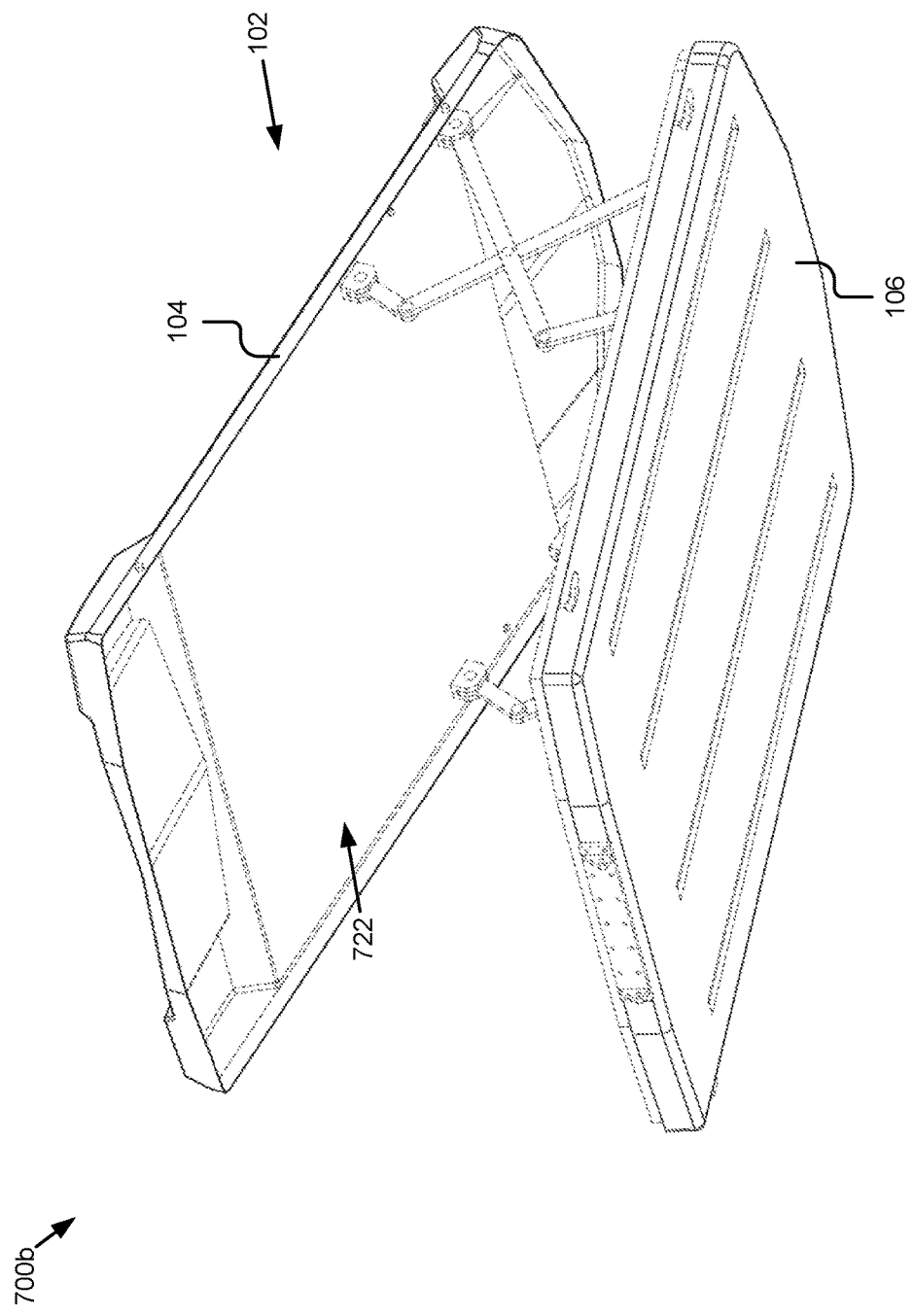

FIG. 7B is a bottom perspective view 700b of an example rooftop tent system 102 in an open position and without a flexible membrane 110. The view 700b illustrates an example interior structure 722 of the top shell member 104, according to some implementations. It should be noted that while no frame, such as an internal frame, is illustrated in FIG. 7B, certain portions of the bottom shell member 106 and/or top shell member 104 may be reinforced with a frame, brackets, or other reinforcing structures.

In the foregoing description, for purposes of explanation, numerous specific details are set forth in order to provide a thorough understanding of the technology. It will be apparent, however, that the technology described herein can be practiced without these specific details.

Reference in the specification to "one implementation", "an implementation", "some implementations", or "other implementations" means that a particular feature, structure, or characteristic described in connection with the implementation is included in at least one implementation of the disclosure. The appearances of the term "implementation" or "implementations" in various places in the specification are not necessarily all referring to the same implementation.

In addition, it should be understood and appreciated that variations, combinations, and equivalents of the specific implementations, implementations, and examples may exist, are contemplated, and are encompassed hereby. The invention should therefore not be limited by the above described implementations, implementations, and examples, but by all implementations, implementations, and examples, and other equivalents within the scope and spirit of the invention as claimed.

What is claimed is:

1. A system, comprising:
    a first shell member including a first rigid portion defining a first perimeter edge, the first shell member adapted to mount to a roof of a vehicle;
    a second shell member including a second rigid portion defining a second perimeter edge, the second perimeter edge adapted to mate with the first perimeter edge when the system is in a closed position, the first shell member and the second shell member defining an interior cavity when the system is in the closed position, the second shell member disposed away from the first shell member when the system is in an open position, the second shell member including a first raised support area and a second raised support area;
    one or more utility rails secured to the second shell member at the first raised support area and the second raised support area, the one or more utility rails extending from the first raised support area to the second raised support area, the one or more utility rails adapted to support one or more items on top of the second shell member; and
    an articulating mechanism coupling the first shell member to the second shell member, the articulating mechanism coupled with the second shell member to transfer a weight of the second shell member and the one or more utility rails to the roof of the vehicle when the system is in the open position, the articulating mechanism adapted to articulate to a first position when the system is in the closed position and articulate to a second position when the system is in the open position,
    wherein the first raised support area is formed by the second rigid portion of the second shell member, and the second raised support area is formed by the second rigid portion of the second shell member.

2. The system of claim 1, wherein the first raised support area includes a first raised support portion, a second raised support portion, and a recessed area positioned between the first raised support portion and the second raised support portion, the first raised support portion being coupled with a first rail of the one or more utility rails, and the second raised support portion being coupled with a second rail of the one or more utility rails.

3. The system of claim 1, wherein:
    the first raised support area includes a first inclined surface supporting a first end of the one or more utility rails; and
    the second raised support area includes a second inclined surface supporting a second end of the one or more utility rails.

4. The system of claim 3, wherein:
    the first inclined surface forms a first oblique angle to a first rail of the one or more utility rails; and
    the second inclined surface forms a second oblique angle to a second rail of the one or more utility rails.

5. The system of claim 3, wherein:
    the second rigid portion of the second shell member includes a recessed plane extending from the first raised support area to the second raised support area; and
    the recessed plane forms an obtuse angle with both the first inclined surface and the second inclined surface.

6. The system of claim 1, wherein the first raised support area is coupled with a first end of the one or more utility rails by a rail brace member, the rail brace member having a utility rail receiving portion that couples the rail brace member with the first end of the one or more utility rails, the rail brace member having a mounting plate that couples the rail brace member with the first raised support area.

7. The system of claim 6, wherein the mounting plate mates with an inclined surface of the first raised support area and holds a first rail of the one or more utility rails at an obtuse angle to the inclined surface.

8. The system of claim 1, wherein the one or more utility rails include:
    a first bar extending from the first raised support area; and
    a second bar extending from the second raised support area, the second bar being parallel to the first bar.

9. The system of claim 1, further comprising:
    a flexible membrane extending between the first perimeter edge and the second perimeter edge, a first membrane edge of the flexible membrane adapted to connect to the first perimeter edge and a second membrane edge of the flexible membrane adapted to connect to the second perimeter edge.

10. The system of claim 9, wherein:
    the flexible membrane includes a first membrane fastener extending along and fixably attached to the first membrane edge,
    the first membrane fastener adapted to detachably couple to a first interconnecting member fastener of a first interconnecting member,
    the first interconnecting member adapted to be secured to the first perimeter edge of the first shell member.

11. The system of claim 10, wherein:
    the flexible membrane includes a second membrane fastener extending along and fixably attached to the second membrane edge,
    the second membrane fastener adapted to detachably couple to a second interconnecting member fastener of a second interconnecting member,
    the second interconnecting member adapted to be secured to the second perimeter edge of the second shell member.

12. The system of claim 11, wherein:
    the first interconnecting member includes an interconnecting member body, an attachment member, and the first interconnecting member fastener,
        the interconnecting member body having a rectangular shape defining a first longitudinal edge and a second longitudinal edge, the attachment member attached to the interconnecting member body along the first longitudinal edge, the attachment member attached to the first shell member along at least a portion of the first perimeter edge so that the first interconnecting member and the first shell member are fixably attached together, the first interconnecting member fastener attached to the interconnecting member body along the second longitudinal edge.

13. The system of claim 12, wherein:

the first membrane fastener includes a first membrane zipper half, the first membrane zipper half having a first zipper tape and a first series of zipper teeth extending along and fixably attached to the first zipper tape; and the first interconnecting member fastener includes a first interconnecting member zipper half, the first interconnecting member zipper half having a second zipper tape and a second series of zipper teeth extending along and fixably attached to the second zipper tape.

14. The system of claim 12, wherein:

the first shell member has an attachment member receptacle attached along the first perimeter edge, the attachment member receptacle adapted to receive and retain the attachment member.

15. The system of claim 1, wherein:

the articulating mechanism includes a gas ram extending from a first location on the articulating mechanism to a second location on the articulating mechanism, the gas ram assisting the second shell member to be lifted into the open position.

16. The system of claim 1, wherein the second shell member is configured to move away from the first shell member to transition from the closed position to the open position.

17. A roof-top enclosure comprising:

a first shell member including a first rigid portion defining a first perimeter edge, the first shell member adapted to mount to a roof of a vehicle;

a second shell member including a second rigid portion defining a second perimeter edge, the second perimeter edge adapted to mate with the first perimeter edge when the roof-top enclosure is in a closed position, the first shell member and the second shell member defining an interior cavity when the roof-top enclosure is in the closed position, the second shell member disposed away from the first shell member when the roof-top enclosure is in an open position, the second shell member including a first portion, a second portion, and a recessed area extending between the first portion and the second portion, the recessed area being recessed from the first portion and the second portion toward a location of the first shell member when the roof-top enclosure is in the closed position;

one or more utility rails secured to the second shell member at the first portion and the second portion, the one or more utility rails extending into at least part of the recessed area between the first portion and the second portion, the one or more utility rails adapted to support one or more items on top of the second shell member; and an articulating mechanism coupling the first shell member to the second shell member, the articulating mechanism coupled with the second shell member to transfer a weight of the second shell member and the one or more utility rails to the roof of the vehicle when the roof-top enclosure is in the open position, the articulating mechanism adapted to articulate to a first position when the roof-top enclosure is in the closed position and articulate to a second position when the roof-top enclosure is in the open position.

18. The roof-top enclosure of claim 17, wherein:

the first portion includes a first raised inclined surface supporting a first end of the one or more utility rails, the first raised inclined surface forming a first oblique angle to a first rail of the one or more utility rails; and the second portion includes a second raised inclined surface supporting a second end of the one or more utility rails, the second raised inclined surface forming a second oblique angle to a second rail of the one or more utility rails.

19. The roof-top enclosure of claim 17, wherein the first portion is coupled with a first end of the one or more utility rails using a rail brace member, the rail brace member having a utility rail receiving portion that couples the rail brace member with the first end of the one or more utility rails, the rail brace member having a mounting plate that couples the rail brace member with the first portion.

20. A roof-top enclosure comprising:

a first enclosure member including a first rigid portion adapted to mount to a roof of a vehicle;

a second enclosure member including a second rigid portion adapted to cooperate with the first rigid portion to define an interior cavity when the roof-top enclosure is in a closed position, the second enclosure member disposed away from the first enclosure member when the roof-top enclosure is in an open position, the second enclosure member including a first raised support area and a second raised support area;

one or more utility rails secured to the second enclosure member at the first raised support area and the second raised support area, the one or more utility rails extending from the first raised support area to the second raised support area, the one or more utility rails adapted to support one or more items on top of the second enclosure member; and an articulating mechanism coupling the first enclosure member to the second enclosure member, the articulating mechanism coupled with the second enclosure member to transfer a weight of the second enclosure member and the one or more utility rails to the roof of the vehicle when the roof-top enclosure is in the open position, the articulating mechanism adapted to articulate to a first position when the roof-top enclosure is in the closed position and articulate to a second position when the roof-top enclosure is in the open position, wherein the first raised support area includes a first inclined surface supporting a first end of the one or more utility rails, and the second raised support area includes a second inclined surface supporting a second end of the one or more utility rails.

21. The roof-top enclosure of claim 20, wherein the first inclined surface forms a first oblique angle to a first rail of the one or more utility rails.

22. The roof-top enclosure of claim 20, wherein:

the second rigid portion of the second enclosure member includes a recessed area between the first raised support area to the second raised support area; and the recessed area forms an obtuse angle with both the first inclined surface and the second inclined surface.

* * * * *